(12) United States Patent
Pandit et al.

(10) Patent No.: US 12,130,147 B2
(45) Date of Patent: Oct. 29, 2024

(54) QUALITY SCORING FOR PULLOVERS FOR AUTONOMOUS VEHICLES

(71) Applicant: Waymo LLC, Mountain View, CA (US)

(72) Inventors: Salil Pandit, Palo Alto, CA (US); Daniella Gutlansky, San Francisco, CA (US); Eamonn Doherty, Mountain View, CA (US); Eric Friedman, Menlo Park, CA (US); Jonathan Pedersen, San Francisco, CA (US); Andrew Chan, San Carlos, CA (US); Gaurav Agarwal, Sunnyvale, CA (US); Bruce Mai, Sacramento, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/410,068

(22) Filed: Aug. 24, 2021

(65) Prior Publication Data

US 2022/0099450 A1    Mar. 31, 2022

Related U.S. Application Data

(60) Provisional application No. 63/084,373, filed on Sep. 28, 2020.

(51) Int. Cl.
*G01C 21/34* (2006.01)
*B60W 30/095* (2012.01)
*B60W 60/00* (2020.01)

(52) U.S. Cl.
CPC ....... *G01C 21/3461* (2013.01); *B60W 30/095* (2013.01); *B60W 60/0015* (2020.02);
(Continued)

(58) Field of Classification Search
CPC .......... G01C 21/3461; G01C 21/3438; B60W 60/00253; B60W 60/0015; B60W 30/095;
(Continued)

(56) References Cited

U.S. PATENT DOCUMENTS 10,528,059 B2   1/2020   Donnelly et al.
10,810,883 B1   10/2020  Rander et al.
(Continued)

FOREIGN PATENT DOCUMENTS

| CN | 107750375 A | 3/2018 |
| CN | 108766011 A | 11/2018 |
| CN | 111009151 A | 4/2020 |

OTHER PUBLICATIONS

Partial European Search Report for European Patent Application No. 21197766.5, Mar. 9, 2022.
(Continued)

*Primary Examiner* — Anne Marie Antonucci
*Assistant Examiner* — Jingli Wang
(74) *Attorney, Agent, or Firm* — Botos Churchill IP Law

(57) ABSTRACT

Aspects of the disclosure relate to evaluating quality of a predetermined pullover location for an autonomous vehicle. For instance, a plurality of inputs for the predetermined pullover location may be received. The plurality of inputs may each include a value representative of a characteristic of the predetermined pullover location. The plurality of inputs may be combined to determine a pullover quality value for the predetermined pullover location. The pullover quality value may be provided to a vehicle in order to enable the vehicle to select a pullover location for the vehicle.

20 Claims, 13 Drawing Sheets

(52) U.S. Cl.
CPC ... *B60W 60/00253* (2020.02); *G01C 21/3438* (2013.01); *B60W 2552/45* (2020.02); *B60W 2554/404* (2020.02); *B60W 2554/80* (2020.02)

(58) Field of Classification Search
CPC ....... B60W 2554/404; B60W 2554/80; B60W 2552/45
See application file for complete search history.

(56) References Cited

U.S. PATENT DOCUMENTS

| | | | |
|---|---|---|---|
| 2005/0055139 A1* | 3/2005 | Tanaka | B62D 15/0285 701/1 |
| 2013/0158861 A1 | 6/2013 | Lerenc | |
| 2013/0158869 A1 | 6/2013 | Lerenc | |
| 2014/0136045 A1 | 5/2014 | Zhu et al. | |
| 2015/0130638 A1* | 5/2015 | Bahgat | G08G 1/0175 340/932.2 |
| 2015/0279213 A1 | 10/2015 | Balter et al. | |
| 2016/0334236 A1* | 11/2016 | Mason | G01C 21/3461 |
| 2016/0370194 A1* | 12/2016 | Colijn | G08G 1/205 |
| 2017/0057510 A1* | 3/2017 | Herbach | B60W 30/181 |
| 2017/0148324 A1* | 5/2017 | High | G08G 1/144 |
| 2017/0169535 A1* | 6/2017 | Tolkin | G06Q 50/30 |
| 2017/0192432 A1 | 7/2017 | Arden et al. | |
| 2017/0274901 A1 | 9/2017 | Herbach et al. | |
| 2018/0113470 A1 | 4/2018 | Iagnemma et al. | |
| 2018/0267541 A1 | 9/2018 | Goldberg et al. | |
| 2018/0304926 A1* | 10/2018 | Ghose | B62D 15/0285 |
| 2018/0357900 A1* | 12/2018 | Wang | G06Q 20/00 |
| 2019/0064814 A1* | 2/2019 | Pandit | G08G 1/202 |
| 2019/0111916 A1* | 4/2019 | Lee | G05D 1/0088 |
| 2019/0120640 A1 | 4/2019 | Ho et al. | |
| 2019/0155283 A1 | 5/2019 | Herbach et al. | |
| 2019/0382001 A1 | 12/2019 | Chelian | |
| 2020/0240798 A1 | 7/2020 | Gao et al. | |
| 2020/0301419 A1 | 9/2020 | Joseph et al. | |
| 2020/0409386 A1* | 12/2020 | Thakur | G01C 21/343 |

OTHER PUBLICATIONS

The First Office Action for Chinese Patent Application No. 202111134687.4, Feb. 1, 2024, 23 Pages.
The Second Office Action for Chinese Patent Application No. 202111134687.4, Jul. 4, 2024, 27 Pages.

* cited by examiner

QUALITY SCORING FOR PULLOVERS FOR AUTONOMOUS VEHICLES

CROSS REFERENCE TO RELATED APPLICATIONS

This application claims the benefit of the filing date of U.S. Provisional Patent Application No. 63/084,373 filed Sep. 28, 2020, the disclosure of which is hereby incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings.

BRIEF SUMMARY

Aspects of the disclosure provide a method of evaluating quality of a predetermined pullover location for an autonomous vehicle. The method includes receiving, by one or more processors, a plurality of inputs for the predetermined pullover location, the plurality of inputs each including a value representative of a characteristic of the predetermined pullover location; combining, by the one or more processors, the plurality of inputs to determine a pullover quality value for the predetermined pullover location; and providing, by the one or more processors, the pullover quality value to a vehicle in order to enable the vehicle to select a pullover location for the vehicle.

In one example, the characteristic includes expected curb occupancy for the predetermined pullover location for a given period of time. In another example, the characteristic includes likelihood of unparking vehicles for the predetermined pullover location for a given period of time. In another example, the characteristic includes expected duration of parking of vehicles for the predetermined pullover location for a given period of time. In this example, the expected duration of parking of vehicles for the predetermined pullover location for a given period of time is expressed as a binary value. In another example, the characteristic includes road geometry for the predetermined pullover location. In this example, the road geometry relates to whether vehicles park on one or both sides of a road at the predetermined pullover location. In another example, the characteristic relates to whether the predetermined pullover location is adjacent to a bicycle lane. In another example, the characteristic includes traffic conditions at the predetermined pullover location for a given period of time. In another example, the characteristic includes legal restrictions at the predetermined pullover location. In another example, the characteristic includes a history of attempted pullovers at the predetermined pullover location by autonomous vehicles. In another example, the characteristic includes a likelihood of emergency vehicles on a road at the predetermined pullover location. In another example, the characteristic is a feasibility of a particularly sized or shaped vehicle parking in the predetermined pullover location. In another example, the characteristic is results of running simulations of autonomous vehicles attempting to park in the predetermined pullover location. In another example, the characteristic is input from passengers of autonomous vehicles providing feedback about a pullover by a vehicle. In another example, the method also includes receiving, from a client computing device, a request for a trip identifying a first location; using the pullover quality value and the first location to identify a suggested location for the trip; and providing the suggested location to the client computing device for display to a user. In another example, the method also includes receiving, from a client computing device, a request for a trip identifying a first location; using the pullover quality value and the first location to identify a suggested location for the trip; and providing a notification to the client computing device indicating that a vehicle will pick up or drop off a passenger at the suggested location. In this example, the notification includes context indicating why the vehicle will pick up or drop off a passenger at the suggested location, and the method further includes determining the context based on the pullover quality value. In addition, the method also includes determining an estimated walking time to the suggested location and comparing the estimated walking time to a threshold, and wherein providing the notification is further based on the comparison. In this example, when the comparison indicates that the estimated walking time is greater than the threshold, providing the notification further includes providing the estimated walking time for display with the notification.

DETAILED DESCRIPTION

Overview

Figure 1:
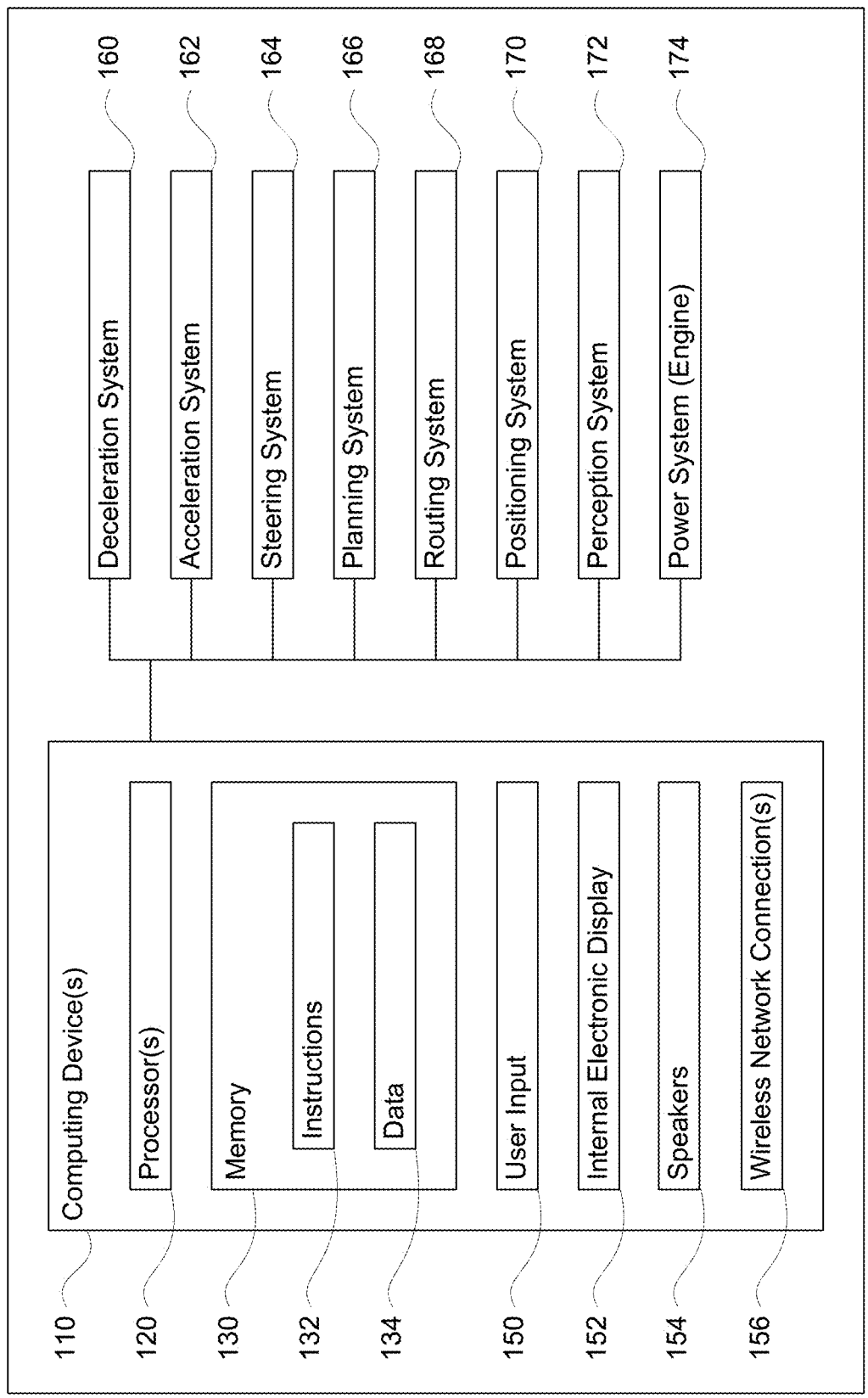
FIG. 1 is a functional diagram of an example vehicle in accordance with an exemplary embodiment.

The technology relates to improving selection of pullover locations, for instance for temporary parking as well as pickup and drop off locations, for instance, for passengers or goods (e.g. deliveries). This may in effect result in providing better matching between an expected pullover location and the actual pullover location through historical and learned data. A successful pullover for an autonomous vehicle is one that is predictable and one in which the passenger's expectation matches with the vehicle's final location. To enable this, a pullover quality value or estimation ("PQ" value) may be determined for every possible pullover location in map information. In this regard, all pullover locations may be predetermined and evaluated individually using a backend processing system.

A PQ value for a given pullover location may be determined using a plurality of different inputs. A first input may be curb occupancy. Curb occupancy may define whether there will be an available curb space or not, and not necessarily what objects occupy the curb.

Another input to PQ value values may be the likelihood of unparking vehicles and/or the duration of vehicles parking in a particular pullover location. This value may suggest where vehicles are parking and unparking most often and like the curb occupancy can be determined from observations of vehicles parking and unparking as well as how long vehicles have been parked at the pullover location (i.e. how long vehicles of the fleet have been parked there).

Another input to PQ value values may be road geometry or rather the drivable width of a road adjacent to the pullover location. For instance some pullover locations may be associated with narrower roads where vehicles park on both sides of the street, cul-de-sacs or blind corners where it may be difficult to park truly perpendicular to a curved curb, etc.

Another input to PQ value may include how likely a pullover location is to cause inconvenience to other road users. For example, this input may take into account whether another vehicle could move around, and if they do, whether that would require the other vehicle to cross yellow lines, etc.

Another input to PQ value may be bicycle traffic or the presence of bike lanes or bicyclists. It may be desirable to avoid parking in areas with bike lanes for safety reasons.

Another input to PQ value may be traffic conditions. Traffic conditions may be determined based on historical observations or traffic data, real time traffic feeds, etc. This may include discrete determinations such as the average speed on the road adjacent to a pullover location, the ratio of average speed to speed limit, volume of traffic (vehicles/h), and occupancy percentage as a measure of congestion).

Another input into PQ value may be legal restrictions. Such restrictions may involve whether a vehicle is able to park in a particular pullover location or if it is reserved for emergencies only.

Another input to PQ value may be the history of pullovers by autonomous vehicles for a pullover location. This information may include whether such vehicles had to double-park, parked awkwardly (e.g. steep angles relative to the curb), blocked driveways, parked close to other objects (other vehicles, cones, vegetation, etc.), had to parallel park, received a parking ticket (e.g. a parking violation), blocked or otherwise inconvenienced other traffic, etc.

Another input to PQ value may be the volume of parked or moving emergency vehicles near a pullover location. For example, when emergency vehicles are consistently and constantly moving in and out of a specific area, it may be preferable to route around or avoid parking in such areas. In this way, the vehicles can avoid blocking or having to allow such emergency vehicles to pass.

Another input to PQ value may be feasibility of parking in a pullover location. For example, given the geometry of a pullover location, it may be too small or too narrow for a particular class of vehicle.

Another input to PQ value may be simulation results. For example, simulations may be run to determine how a vehicle would park in the pullover location. This could be achieved by using logged data from our prior driving and simulating how vehicles would have pulled over either in the original pickup and drop off locations, or other random locations in simulation.

Another input to PQ value may be human input. For instance, a pullover metric, which can be generated by surveys about passenger experience during trips (e.g. star ratings) or human labeling of logged data from vehicles pulling over, can be used to measure how good a particular pullover location is.

Another input to PQ value may be the average length of time a pullover at this location generally takes. For instance, if pickups or drop offs at a given pullover location are generally quick, the impact of other inputs might be weighted differently.

Another input to PQ value may be accessibility of a pullover location. Accessibility may relate to how easy a pullover location is to access for handicapped persons, persons with mobility issues, persons with vision and/or hearing issues, or other disabilities. This may include whether there are nearby accessible curbs, the general ease of walking in the vicinity such as whether there are ramps or steps, etc.

The inputs may be combined into a PQ value for each pullover location. For example, PQ value could be a discrete value which is determined from a combination of the aforementioned inputs. The PQ value and the aforementioned inputs can be used in various ways. For example, when selecting a pickup or drop off location at a dispatching server computing device or onboard a vehicle, pulling over where there is likely to be available curb space or in pullover locations with higher PQ value may be prioritized. In addition, PQ value or curb occupancy can be used to encourage passengers to select locations near lower occupancy locations. PQ value and curb occupancy can also be used for routing and planning (trajectories) purposes.

The features described herein may allow for better selection of pullover locations, for instance for temporary parking as well as pick up and drop off locations for passengers as well as goods. As noted above, PQ value and/or curb occupancy can be used in initial pickup and drop off location selection as well as for planning and routing purposes. Thereby improving the overall functionality of the transportation services as well as passenger experience.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone), various electronic displays (e.g., a monitor having a screen or any other electrical device that is operable to display information), and speakers 154 to provide information to a passenger of the vehicle 100 as needed. For example, electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 166, positioning system 170, and perception system 172 in order to control the movement, speed, etc. of vehicle 100 in accordance with the instructions 134 of memory 130 in the autonomous driving mode.

As an example, a computing device of the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use a signaling system in order to signal the vehicle's intent to other drivers or vehicles, for example, by lighting turn signals or brake lights when needed.

Routing system 166 may be used by the computing devices 110 in order to generate a route to a destination. Planning system 168 may be used by computing devices 110 in order to follow the route. In this regard, the planning system 166 and/or routing system 166 may store detailed map information, e.g., highly detailed maps identifying a road network including the shape and elevation of roadways, lane lines, intersections, crosswalks, speed limits, traffic signals, buildings, signs, real time traffic information, pullover spots, vegetation, or other such objects and information.

Figure 2A:
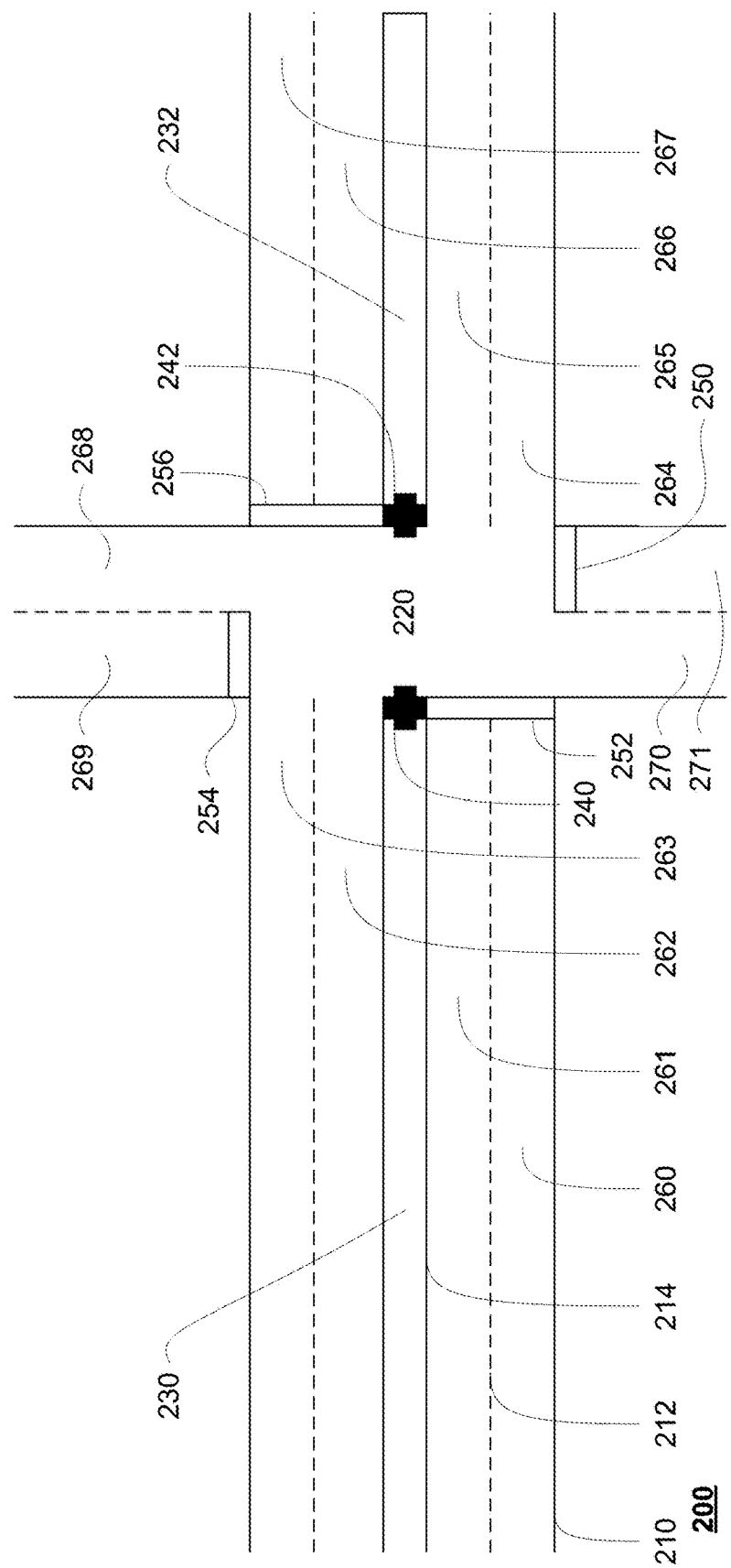
FIGS. 2A and 2B is an example of map information in accordance with aspects of the disclosure.
Figure 2B:
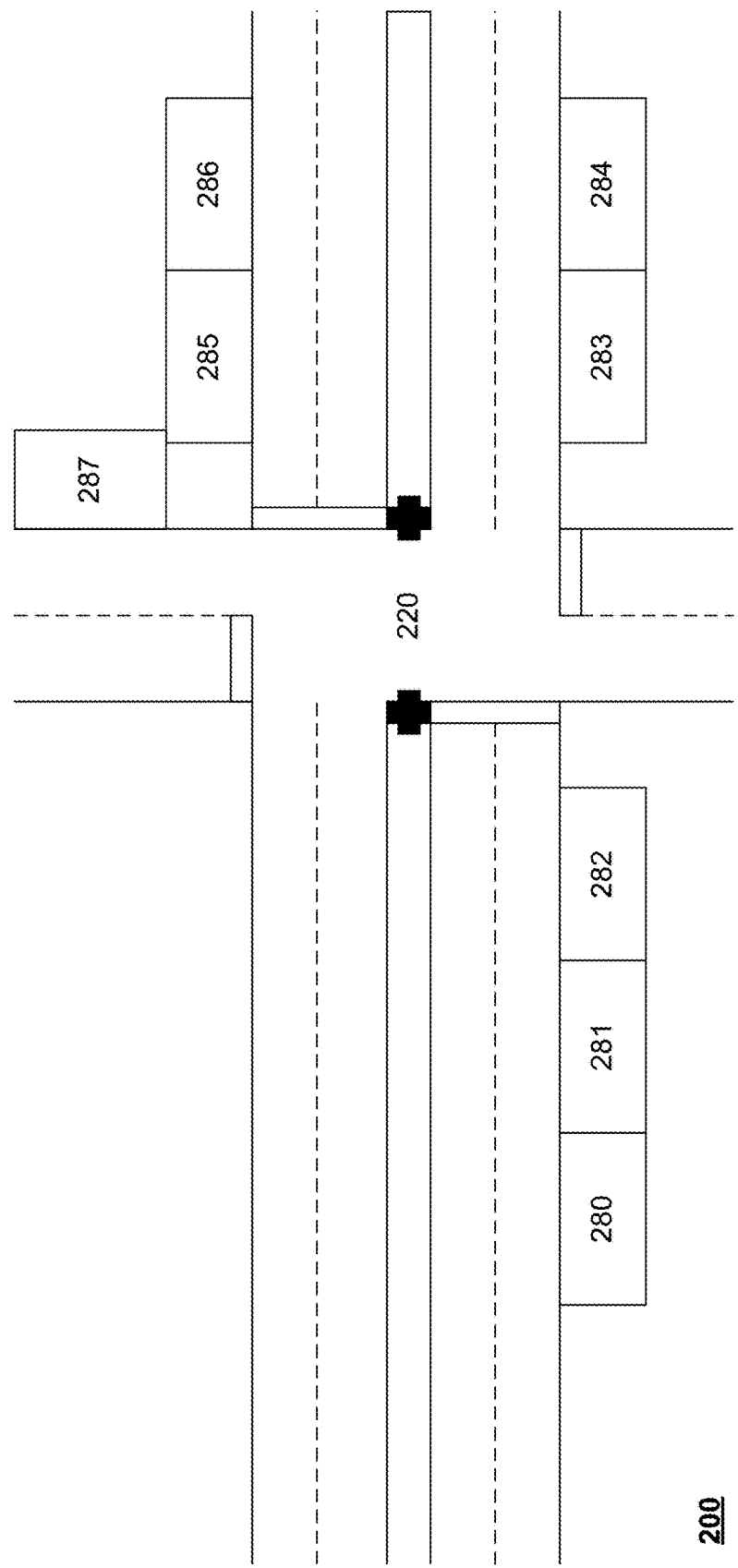

FIGS. 2A and 2B are an example of map information 200 for a section of roadway including intersection 220. FIG. 2A depicts a portion of the map information that includes information identifying the shape, location, and other characteristics of lane markers or lane lines 210, 212, 214, median areas 230, 232, traffic signals 240, 242, as well as stop lines 250, 252, 254, 256. The lane lines may also define various lanes 260-271 or these lanes may also be explicitly identified in the map information 200. In addition to these features, the map information may also include information that identifies the direction of traffic and speed limits for each lane as well as information that allows the computing devices 110 to determine whether the vehicle has the right of way to complete a particular maneuver (i.e. complete a turn or cross a lane of traffic or intersection), as well as other features such as curbs, buildings, waterways, vegetation, signs, etc.

The map information 200 may identify pullover locations which may include areas where a vehicle is able to stop and to pick up or drop off passengers or cargo. These areas may correspond to parking spaces, waiting areas, shoulders, parking lots, etc. For instance, FIG. 2B depicts parking areas 280-287. For simplicity, these pullover locations may correspond to parking spaces, but may correspond to any type of area in which a vehicle is able to stop to pick up and drop off passengers or cargo. In this regard, the predetermined pullover locations may be determined using heuristics, such as every 1 meter or more or less and may be updated periodically, for instance every week or more or less, based on locations where vehicles of the fleet or other vehicles are observed being stopped or pulled over.

Although the map information is depicted herein as an image-based map, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a stop sign may be linked to a road and an intersection, etc. In some examples, the associated data may include grid-based indices of a road network to allow for efficient lookup of certain road network features.

In this regard, in addition to the aforementioned physical feature information, the map information may include a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes.

The routing system 166 may use the roadgraph to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 170 may also include other devices in communication with the computing devices computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
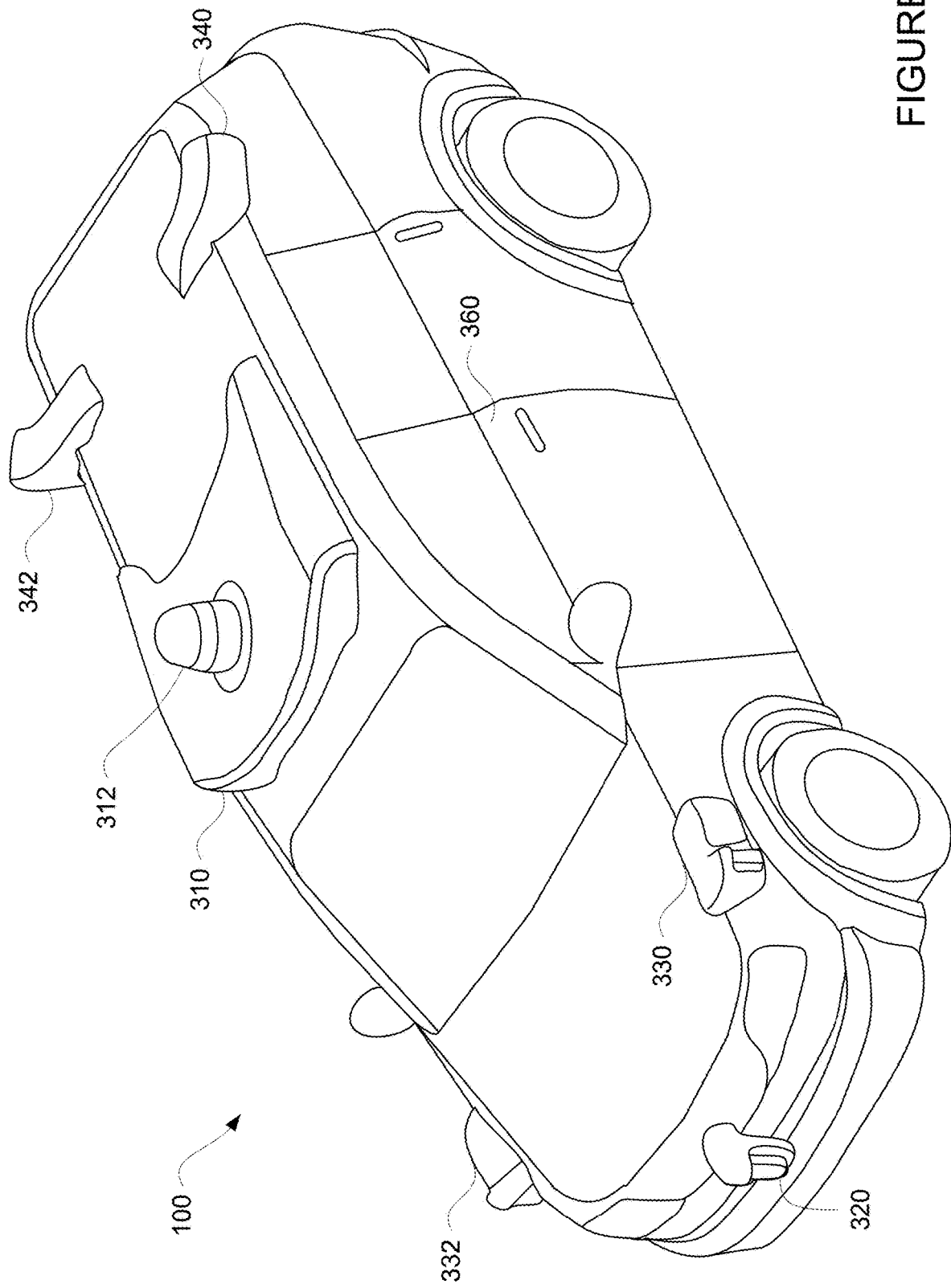
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 166, positioning system 170, perception system 172, and power system 174 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle.

Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 166. The planning system 166 may use this input to generate trajectories for the vehicle to follow for some brief period of time into the future based on a route generated by a routing module of the routing system 166. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 166. The computing devices 110 may use the positioning system 170 to determine the vehicle's location and perception system 172 to detect and respond to objects when needed to reach the location safely. Again, in order to do so, computing devices 110 and/or planning system 166 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
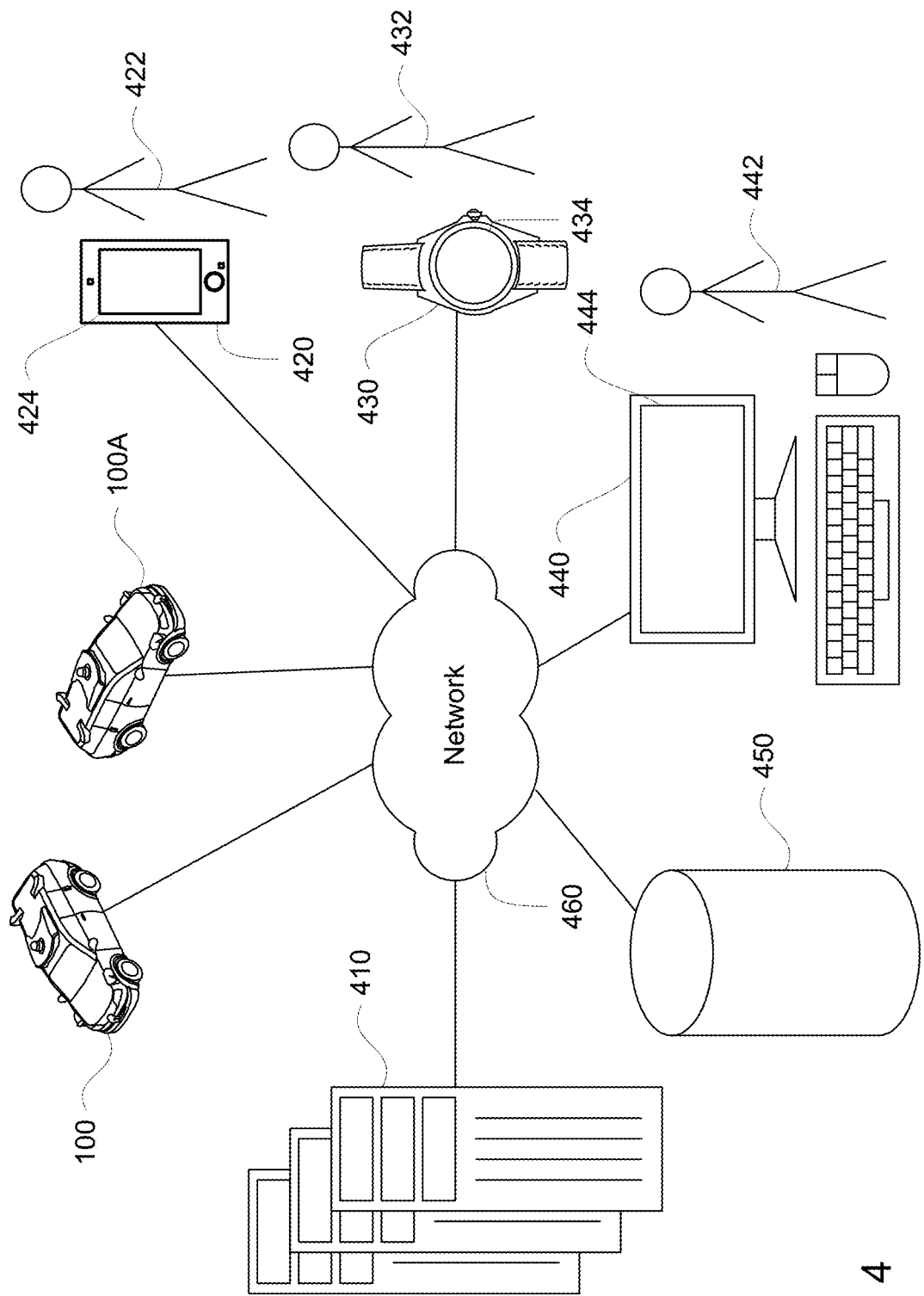
FIG. 4 is a pictorial diagram of an example system in accordance with aspects of the disclosure.
Figure 5:
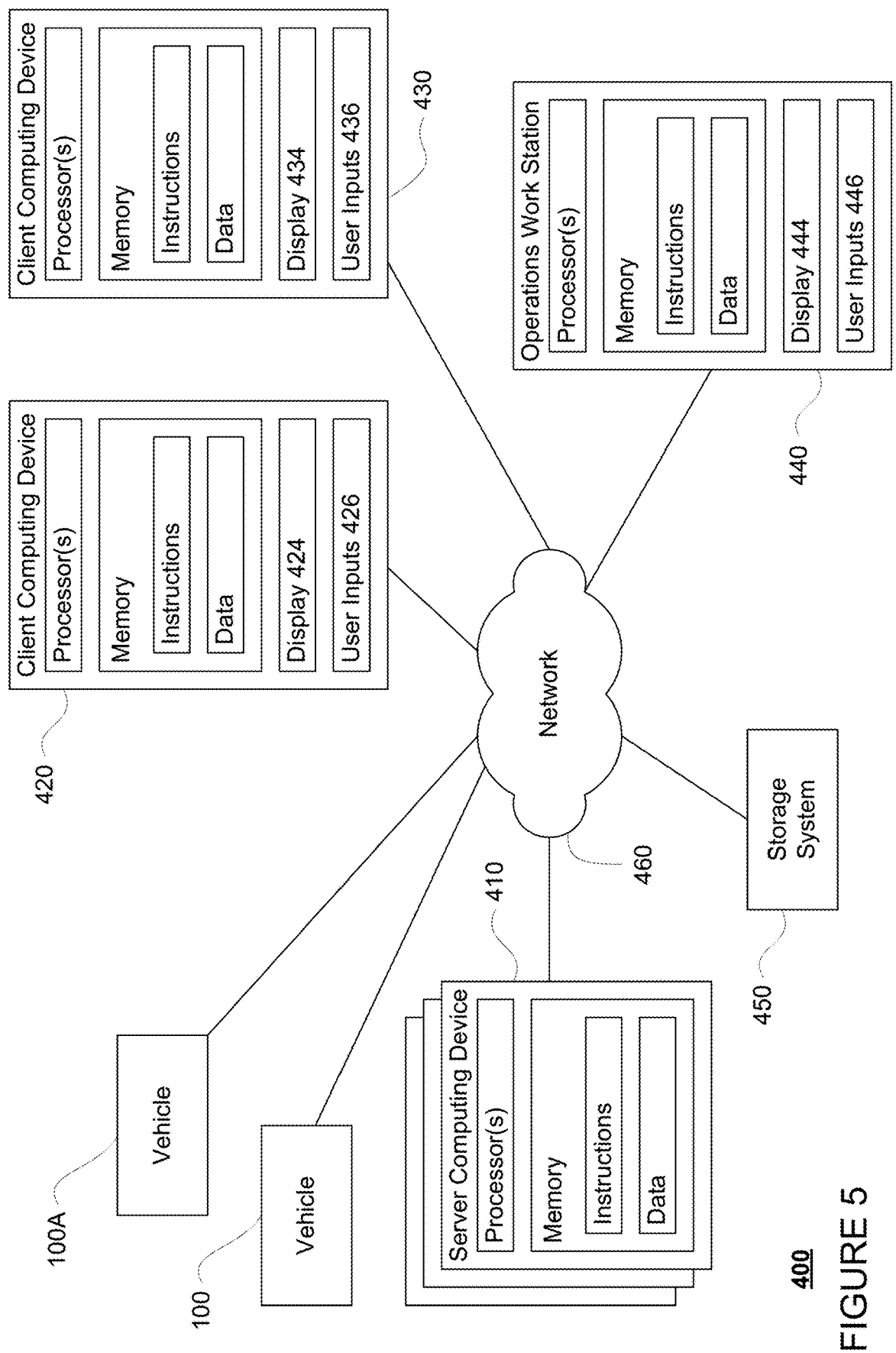
FIG. 5 is a functional diagram of the system of FIG. 4 in accordance with aspects of the disclosure.

Computing devices 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100 and vehicle 100A, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing devices 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing devices 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system which can be used to assign passengers to vehicles, such as vehicle 100 and vehicle 100A, and dispatch those vehicles to different locations in order to pick up and drop off passengers. In addition, server computing devices 410 may use network 460 to transmit and present information to a user and/or an assigned passenger, such as user 422, 432, 442 on a display, such as displays 424, 434, 444 of computing devices 420, 430, 440 and/or display 152 of the vehicles 100, 100A. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 420 may be a mobile phone used by passenger of a vehicle. In other words, in some instances, user 422 may represent a passenger assigned to the vehicle 100. In addition, client communication device 430 may represent a smart watch for a passenger of a vehicle. In other words, in other instances, user 432 may represent a passenger assigned to the vehicle 100. The client communication device 440 may represent a workstation for an operations person, for example, a remote assistance operator or someone who may provide remote assistance to a vehicle and/or a passenger. In other words, user 442 may represent a remote assistance operator. Although only a few passengers and operations person are shown in FIGS. 4 and 5, any number of such, passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc. The storage system 450 may store various information including PQ values, the aforementioned map information as well as inputs that can be used to determine the PQ values as discussed further below.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. As part of this, the user may identify a pickup location, a destination location, a pickup location and a drop off location. In this regard, the drop off location may be a physically different location from a destination location.

A user or passenger may specify a pick up, intermediate destination, and final destination locations in various ways. As an example, a pickup location can be defaulted to a current location of the passenger's client computing device, but may also be a recent or saved location near the current location associated with the passenger's account. The passenger may enter an address or other location information, tap a location on a map or select a location from a list in order to identify a pickup and/or destination location. For instance, the client computing device 420 may send its current location, such as a GPS location, to the one or more server computing devices 410 via network 460 and/or a destination name or address for any intermediate and the final destination. In response, the one or more server computing devices 410 may provide one or more suggested locations or may identify the current location as a pickup location and locations corresponding to the destination name or address as an intermediate or final destination for the vehicle. One the user (now a passenger) has selected or confirmed the pickup and destination locations, the one or more server computing devices may assign a vehicle, such as vehicle 100, to the passenger and the passenger's trip and send dispatching instructions to the vehicle including the pickup location, an intermediate destination, and the final destination. This may cause the vehicle to control itself in the autonomous driving mode towards the pickup location, for instance by using the various systems of the vehicle as described above, in order to complete the trip. Although the examples herein relate to transporting passengers, similar features may be used for the transportation of goods or cargo.

Figure 12:
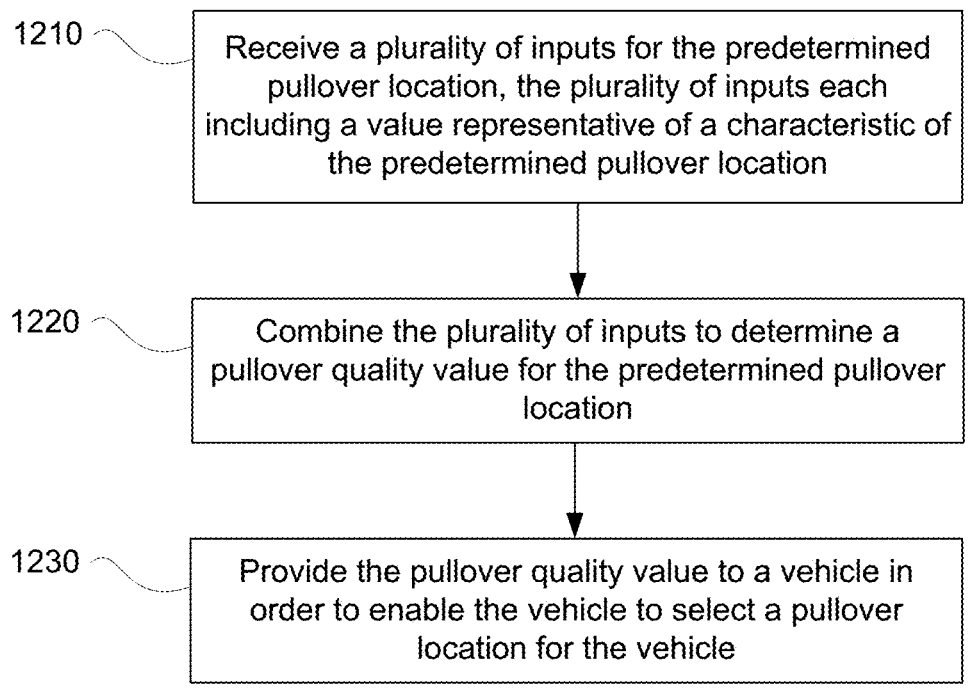
FIG. 12 is an example flow diagram in accordance with aspects of the disclosure.

FIG. 12 provides an example flow diagram 1200 for providing transportation services with autonomous vehicles which may be performed by one or more processors of one or more computing devices such as the processors of the one or more server computing devices 410. For instance, at block 1210, a plurality of inputs for the predetermined pullover location are received. The predetermined pullover location may be one of the predetermined pullover locations from the map information such as described above and may be selected at random or otherwise to generate and/or update a PQ value. The plurality of inputs each include a value representative of a characteristic of the predetermined pullover location.

Figure 6:
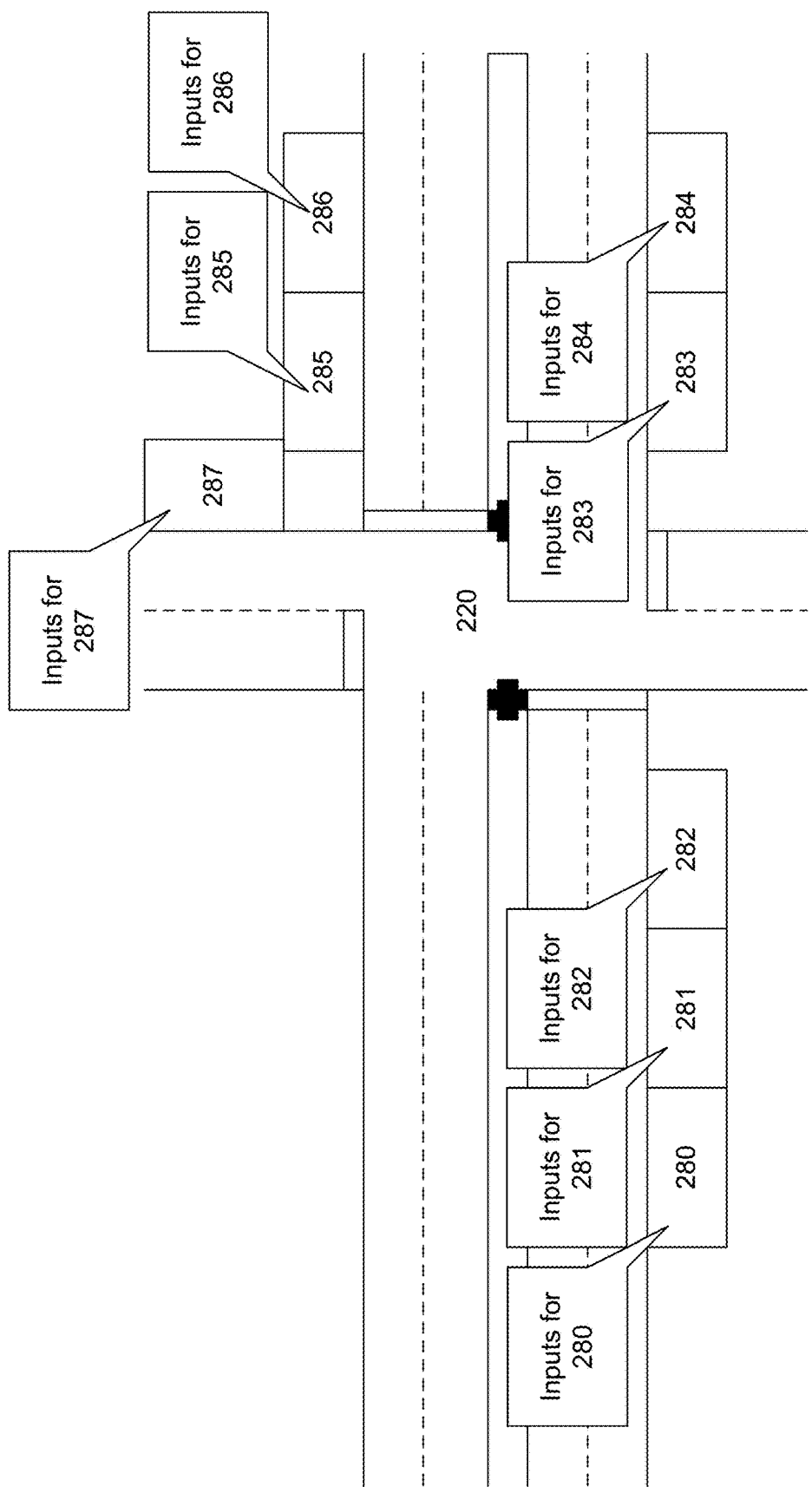
FIG. 6 is an example representation of inputs for a plurality of pullover locations in accordance with aspects of the disclosure.
Figure 7:
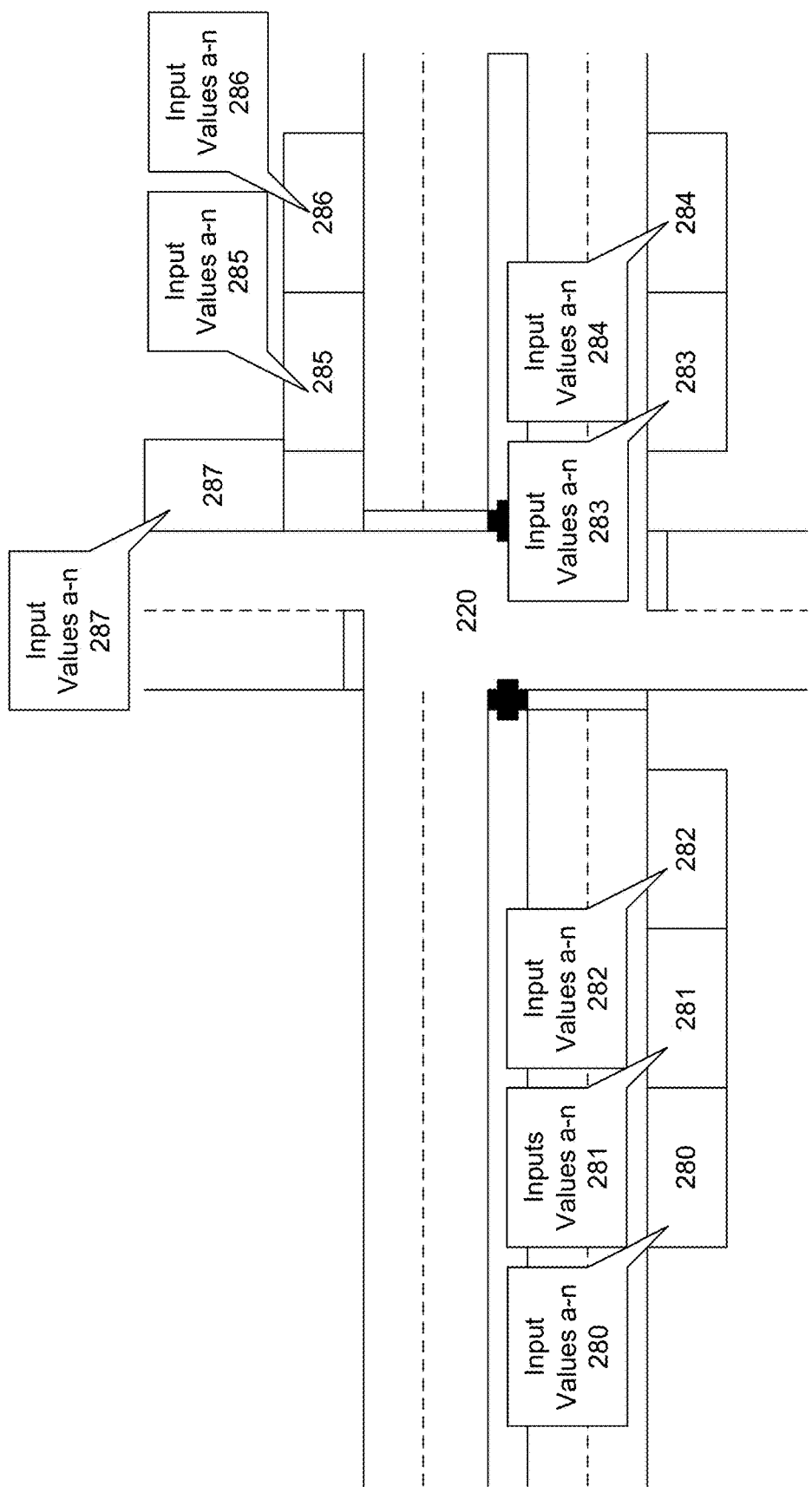
FIG. 7 is an example representation of input values for a plurality of pullover locations in accordance with aspects of the disclosure.

In order to generate a PQ value for a particular pullover location, the one or more server computing devices 410 may first access various inputs. These inputs may be retrieved, for example, from a storage system 450 or other storage locations. FIG. 6 is an example of the map information 200 with annotations for each of the pullover locations 280-278 identifying a plurality of inputs which may be stored in the storage system 450. The server computing devices may use the plurality of inputs to determine actual, estimated or expected input values (or input values a-n as depicted in FIG. 7) for each pullover location 280-287. In turn, these input values may be used to determine a PQ value for that pullover location as discussed further below.

A first input to a PQ value may be estimated or expected curb occupancy. Curb occupancy may define whether there will be an available curb space or not, and not necessarily what objects occupy the curb. For example, a curb could be considered occupied if there are trash cans that prevent a vehicle from getting closer to the curb, if there are construction containers, or if there are parked cars. By understanding where in the world there will be an available curb space, vehicle may be able to effect safer pullovers, ensure better matching between an expected pullover location and the actual pullover location, reason about field of view obstruction, and proactively communicate to a passenger why certain pin suggestions are made. Occupancy can be determined from observations of a pullover location over time. These observations, now curb occupancy input values, may be bucketized or sliced by given periods of time such as time of day, day of week, season (Winter versus Summer), weather conditions (e.g., a location that tends to form puddles after a rain or snow banks after a snowplow is unlikely to be a good pullover spot), etc. As an example, a curb occupancy input value may be expressed as a value from 0 to 1, where 0 indicates a high curb occupancy (and therefore a lower pullover quality) and 1 indicates a low curb occupancy (and therefore a higher pullover quality). Of course, the opposite may also be true, and other values and ranges may be used.

Another input to PQ values may be estimated or expected likelihood of unparking vehicles and/or the duration of vehicles parking in a particular pullover location. This input may suggest where vehicles are parking and unparking most often and like the curb occupancy can be determined from observations of vehicles parking and unparking as well as how long vehicles have been parked at the pullover location (i.e. how long vehicles of the fleet have been parked there). This may be converted into any number of values including a likelihood of unparking vehicles which estimates how likely a given parked vehicle is to unpark itself or rather, a likelihood that one or more parked vehicles will begin to move from respective parked locations. Another example of such values may include estimated duration of vehicles being parked or rather estimated dwell times for vehicles parking at the pullover location. Such values may be expressed as a binary "low" dwell time (for greater amounts of parking and unparking vehicles) or "high" dwell time (for lesser amounts of parking and unparking vehicles). As with the curb occupancy, the likelihood of unparking vehicles and/or duration of vehicles parking input values may be bucketized or sliced by given periods of time such as such as time of day, day of week, season, weather conditions, etc. As an example, a likelihood of unparking vehicles and/or the duration of vehicles parking input value may be expressed as a value from 0 to 1, where 0 indicates a high likelihood of unparking vehicles or a longer duration of vehicles parking (and therefore a lower pullover quality) and 1 indicates a low likelihood of unparking vehicles or a shorter duration of vehicles parking (and therefore a higher pullover quality). Of course, the opposite may also be true, and other values and ranges may be used.

Another input to PQ value values may be road geometry or rather the drivable width of a road adjacent to the pullover location. For instance some pullover locations may be associated with narrower roads where vehicles park on both sides of the street, cul-de-sacs or blind corners where it may be difficult to park truly perpendicular to a curved curb, etc. In such situations, road geometry may be a negative factor for the pullover location (less desirable). For wider roads or roads with parking only on one side may be a positive factor for the pullover location (more desirable). This information may be gleaned from map information and/or observations by vehicles. Another input to PQ value may include the distance from the pullover location to building entrances or area entrances (e.g., park entrances, walkway entrances etc.). In this regard, pullover locations that are closer to building entrances (more desirable) may have a higher PQ value than pullover locations that are farther from building entrances (less desirable). As an example, a geometry input value may be expressed as a value from 0 to 1, where 0 indicates a less desirable geometry (and therefore a lower pullover quality) and 1 indicates a more desirable geometry (and therefore a higher pullover quality). Of course, the opposite may also be true, and other values and ranges may be used.

Another input to PQ value may include estimated or expected likelihood that a pullover location is to cause inconvenience to other road users. For example, this input may take into account whether another vehicle could move around, and if they do, whether that would require the other vehicle to cross yellow lines, etc. In addition, this factor may also take into account whether there is a shoulder where we can stop completely out of the way of traffic. This information may be gleaned from map information and/or historical data. As an example, an inconvenience input value may be expressed as a value from 0 to 1, where 0 indicates a greater likelihood of inconvenience to other road users (and therefore a lower pullover quality) and 1 indicates a lower likelihood of inconvenience to other road users (and therefore a higher pullover quality). Of course, the opposite may also be true, and other values and ranges may be used.

Another input to PQ value may be estimated or expected bicycle traffic or the presence of bike lanes or bicyclists. It may be desirable to avoid parking in areas with bike lanes for safety reasons. In this regard, areas with bike lanes may be a negative factor for a pullover location (less desirable), and areas without bike lanes may be a positive or neutral factor for a pullover location (more desirable). In addition, areas where bicyclists are observed passing vehicles where there is no delineated bike lane may also be an input to PQ value. Bicycle lanes adjacent to pullover locations may be determined from map information and bicycle traffic conditions may be determined by generating heatmaps of frequency of passing bikers at different points in time. For pullover locations adjacent to a non-busy bike lane may have very little effect on PQ value, whereas pullover locations adjacent to busier bicycle lanes may have a greater effect on PQ value (resulting in the PQ value being very small). As with the curb occupancy and dwell times, bicycle traffic or the presence of bike lanes or bicyclists input values may be bucketized or sliced by given periods of time such as time of day, day of week, season, weather conditions, etc. As an example, a bicycle traffic or the presence of bike lanes or bicyclists input value may be expressed as a value from 0 to 1, where 0 indicates higher levels of bicycle traffic or the presence of bike lanes or bicyclists (and therefore a lower pullover quality) and 1 indicates a lower levels of bicycle traffic or no bicycle lanes or bicyclists (and therefore a higher pullover quality). Of course, the opposite may also be true, and other values and ranges may be used.

Another input to PQ value may be estimated or expected traffic conditions. Traffic conditions may be determined based on historical observations or traffic data, real time traffic feeds, etc. This may include discrete determinations such as the average speed on the road adjacent to a pullover location, the ratio of average speed to speed limit, volume of traffic (vehicles/h), and occupancy percentage as a measure of congestion. In some instances, heavier traffic may or may not be a deterrent, so this may be considered more or less desirable, but the more data collected, the better the PQ value will be. For instance, if the vehicle is turning onto a heavy traffic road that is where the drop off is, when the vehicle is likely to be stopped for a bit, this could be used as a signal to encourage a passenger to make an early exit. As with the curb occupancy, dwell times, and bicycle traffic, the traffic condition input values may be bucketized or sliced by given periods of time such as time of day, day of week, season, weather conditions, etc. As an example, a traffic conditions input value may be expressed as a value from 0 to 1, where 0 indicates less desirable traffic conditions (and therefore a lower pullover quality) and 1 indicates more desirable traffic conditions (and therefore a higher pullover quality). Of course, the opposite may also be true, and other values and ranges may be used.

Another input into PQ value may be legal restrictions. Such restrictions may involve whether a vehicle is able to park in a particular pullover location or if it is reserved for emergencies only. Examples may include locations with posted parking restrictions (no overnight parking or no commercial vehicles or no parking during certain hours), fire hydrants, yellow curb areas (where presumably parking is not allowed), etc. This information may be determined from the detailed maps used to control the vehicles as well as other types of maps or databases such as those maintained by municipalities, or other third-party sources. As an example, a legal restrictions input value may be expressed as a value from 0 to 1, where 0 indicates more legal restrictions (and therefore a lower pullover quality) and 1 indicates fewer legal restrictions (and therefore a higher pullover quality). Of course, the opposite may also be true, and other values and ranges may be used.

Another input to PQ value may be the history of pullovers by autonomous vehicles for a pullover location. This information may include whether such vehicles had to double-park, parked awkwardly (e.g. steep angles relative to the curb), blocked driveways, parked close to other objects (other vehicles, cones, vegetation, etc.), had to parallel park, received a parking ticket (e.g. a parking violation), blocked or otherwise inconvenienced other traffic, etc. As with the curb occupancy, dwell times and traffic conditions, the history of pullovers input values may be bucketized or sliced by given periods of time such as time of day, day of week, season, weather conditions, etc. As an example, a history of pullovers input value may be expressed as a value from 0 to 1, where 0 indicates a history of no or fewer successful pullovers (and therefore a lower pullover quality) and 1 indicates a history of more successful pullovers (and therefore a higher pullover quality). Of course, the opposite may also be true, and other values and ranges may be used.

Another input to PQ value may be estimated or expected volume of parked or moving emergency vehicles near a pullover location. For example, when emergency vehicles are consistently and/or constantly moving in and out of a specific area, it may be preferable to route around or avoid parking in such areas. In this way, the vehicles can avoid blocking or having to allow such emergency vehicles to pass. The presence of parked emergency vehicles may be determined from observations by vehicles. In addition, observations of moving emergency vehicles can be used by vehicle's behavior systems to predict trajectories and look for commonalities to identify locations where emergency vehicles are most likely to be. This information can be supplemented with map information identifying locations of areas where emergency vehicles are likely to be, such as a firehouse, a police station, a municipal building, a court house, emergency services building, hospitals, fire hydrant, etc. As with the curb occupancy, dwell times, traffic conditions, and history of pullovers, the volume of parked or moving emergency value input values may be bucketized or sliced by given periods of time such as time of day, day of week, season, weather conditions, etc. As an example, a volume of parked or moving emergency vehicles input value may be expressed as a value from 0 to 1, where 0 indicates a greater volume of parked or moving emergency vehicles (and therefore a lower pullover quality) and 1 indicates none or a lesser volume of parked or moving emergency vehicles (and therefore a higher pullover quality). Of course, the opposite may also be true, and other values and ranges may be used.

Another input to PQ value may be estimated or expected feasibility of parking in a pullover location. For example, given the geometry of a pullover location, it may be too small or too narrow for a particular class of vehicle. In this regard, this factor may be used to reduce the overall PQ value or simply set the PQ value to zero. Beyond the geometry of the location itself where the vehicle will pullover, this factor may also consider what is location beyond the drivable road surface. For example, a pullover location that is easy to park in but has heavy shrubs or a wall just next to the road may still be still a poor pullover spot for the purpose of pickup or drop off. This information may also be gleaned from the map information, which may identify areas beyond the drivable road surface as "walkable surfaces", "vegetation", "low wall", etc. As an example, a feasibility input value may be expressed as a value from 0 to 1, where 0 indicates a lesser feasibility (and therefore a lower pullover quality) and 1 indicates greater feasibility (and therefore a higher pullover quality). Of course, the opposite may also be true, and other values and ranges may be used.

Another input to PQ value may be simulation results. For example, simulations may be run to determine how a vehicle would park in the pullover location. This could be achieved by using logged data from our prior driving and simulating how vehicles would have pulled over either in the original pickup and drop off locations, or other random locations in simulation. As another example, new scenarios and scenes could be created and used to calculate input for PQ value. Such inputs would again be additional values which may be weighted by the quality of the simulation. For instance, simulations may have a range of qualities that include properties such as realism (e.g., the number or positioning of other vehicles in the scene, the likelihood of such scenarios occurring, etc.). Simulations may be of lower quality and therefore lower weight if they are unrealistic. For example, a simulation which includes no other vehicles in a geographic area where there would normally be a high volume of traffic would underestimate the challenges in pulling over and therefore be of lower quality or lower weight. As another example, a simulation with an abnormally high number of pedestrians positioned around the vehicle in a geographic area corresponding to a quiet neighborhood street would be of lower quality or lower weight due to its low likelihood of occurrence. As with the curb occupancy, dwell times, and traffic conditions, history of pullovers, and volume of parked or moving emergency vehicles, the simulation results input values may be bucketized or sliced by given periods of time such as time of day, day of week, season, weather conditions, etc. As an example, a simulation results input value may be expressed as a value from 0 to 1, where 0 indicates less desirable simulation results (and therefore a lower pullover quality) and 1 indicates more desirable simulation results (and therefore a higher pullover quality). Of course, the opposite may also be true, and other values and ranges may be used.

Another input to PQ value may be human input. For example, pullover metric, which can be generated by passenger input or responses to surveys about passenger experience during trips (e.g. star ratings) or human labeling of logged data from vehicles pulling over, can be used to measure how good a particular pullover location is. For instance if a human labeler finds that a passenger had to walk far to reach a building entrance, the passenger remained in the vehicle for longer than expected at drop off, or the customer took longer than expected to enter the vehicle at pick up these may be considered negative examples. In some instances, human labelers may add labels identifying which location(s) would have been preferable and a classification of what made a location a good or poor choice. This could be attached either to a very specific pullover situation and used as training data for a machine learning algorithm where the end result could be used to extrapolate labels for new examples or could be provided as a more generic or rules-based input for a location (e.g., "at this time of day/in this weather/etc., this is a poor pullover location because . . . ").

As an example, a human input value may be expressed as a value from 0 to 1, where 0 indicates more negative (less desirable) human inputs (and therefore a lower pullover quality) and 1 indicates more positive (more desirable) human inputs (and therefore a higher pullover quality). Of course, the opposite may also be true, and other values and ranges may be used.

Another input to PQ value may be estimated or expected average length of time a pullover at the pullover location generally takes. For example, if pickups or drop offs at a given pullover location are generally quick, the impact of other inputs (e.g. inconvenience to other road users) might be reduced and therefore have less of an impact on the PQ value. As with the curb occupancy, dwell times, and traffic conditions, history of pullovers, volume of parked or moving emergency vehicles, and simulation results, the average length of time a pullover at this pullover location input values may be bucketized or sliced by given periods of time such as time of day, day of week, season, weather conditions, etc. As an example, an average length of time a pullover at this pullover location generally takes input value may be expressed as a value from 0 to 1, where 0 indicates longer times (and therefore a lower pullover quality) and 1 indicates shorter times (and therefore a higher pullover quality). Of course, the opposite may also be true, and other values and ranges may be used.

Another input to PQ value may be accessibility. Accessibility may relate to how easy a pullover location is to access for handicapped persons, persons with mobility issues, persons with vision and/or hearing issues, or other disabilities. This may include whether there nearby accessible curbs (e.g. breaks in a curb where a wheelchair or cart can pass from a sidewalk to the road surface easily), the general ease of walking in the vicinity such as whether there are ramps (which would make the pullover location more accessible and more desirable from an accessibility standpoint) or steps (which would make the pullover location less accessible and less desirable from an accessibility standpoint), etc. This information may be determined from annotations in the map information identifying whether any of these features (e.g. accessible curbs, ramps, steps, etc.) are nearby to the pullover location. As an example, an accessibility input value from 0 to 1, where 0 indicates lesser accessibility (and therefore a lower pullover quality) and 1 indicates greater accessibility (and therefore a higher pullover quality). Of course, the opposite may also be true, and other values and ranges may be used.

Returning to FIG. 12, at block 1220, the plurality of inputs are combined to determine a pullover quality value for the predetermined pullover location. In other words, the aforementioned input values from each input may be combined into a PQ value for each pullover location. Returning to the example of FIG. 7, each of the input values a-n for each of the pullover locations 280-287 may be combined to determine respective PQ values, and in some cases for different buckets or given periods of time for each pullover location.

A PQ value for a pullover location could be a discrete value which is determined from a combination of the aforementioned inputs. To determine a PQ value, the input values could also be combined in a single overall value which might vary based on why the vehicle is pulling over, (e.g., if extra time is needed for loading cargo, then more heavily penalizing spots that lead to inconvenience, etc. would be appropriate). For example, an input value vector may include input values for each of: curb occupancy (a), likelihood of unparking vehicles and/or the duration of vehicles (b), road geometry (c), inconvenience (d), bicycle traffic or the presence of bike lanes or bicyclists (e), traffic conditions (f), legal restrictions (g), history of pullovers (h), volume of parked or moving emergency vehicles (i), feasibility (j), simulation results (k), human input (1), average length of time a pullover at this location generally takes (m), accessibility (n) and any other input values used (z). In this regard, each pullover location 280-287 would be associated with an input value vector using the input values for that pullover location which may be expressed as: <a, b, c, d, e, f, g, h, i, j, k, l, m, n, . . . z>.

A PQ value may be formatted to be on a particular range such as 0 to 1, where 1 indicates a desirable pullover location and 0 a less desirable pullover location. Alternatively the reverse may be true. In addition, each pullover location may be associated with a plurality of different discrete, overall PQ values for different time buckets or given periods of time as discussed above.

As one example, the input values may be combined to determine a discrete, overall PQ value for a pullover location by taking a sum, an average, a weighted sum, a weighted average of the input values, or selection by a neural network or other machine learning model trained on a large dataset of example pullovers. For example, a sum could be expressed as: a+b+c+d+e+f+g+h+i+j+k+l+m+n+ . . . z. Similarly, an average could be expressed as: (a+b+c+d+e+f+g+h+i+j+k+l+m+n+ . . . z)/N, where N represents the total number of input values used. In the example of a weighted sum or a weighted average, each input value may be weighted by a weighing value. These values may initially be selected manually and adjusted over time based on historical data, manual data analysis, or human labeling. As an example, the historical data may include log data collected from the fleet of vehicles, and adjustments to the weighing values may be based on both the real-world success rate of the pullovers as well as simulations conducted separately to optimize pullover success. For example, through simulations on more data and more recent software, it may become apparent that certain input values are more important than others. The weighting values for those certain input values may be increased and/or the weighting values for the others may be decreased accordingly.

For example, there may be a specific weighing value for each input value used, that is a weighing value for each of: curb occupancy (wa), likelihood of unparking vehicles and/or the duration of vehicles (wb), road geometry (wc), inconvenience (wd), bicycle traffic or the presence of bike lanes or bicyclists (we), traffic conditions (wf), legal restrictions (wg), history of pullovers (wh), volume of parked or moving emergency vehicles (wi), feasibility (wj), simulation results (wk), human input (wl), average length of time a pullover at this location generally takes (wm), accessibility (wn) and any other input values used (wz). For example, a weighted sum for each pullover location 280-287 using the input values for that pullover location could be expressed as: a*wa+b*wb+c*wc+d*wd+e*we+f*wf+g*wg+h*wh+i*wi+j*wj+k*wk+l*wl+m*wm+n*wn+ . . . z*wz. Similarly, an average for each pullover location 280-287 using the input values for that pullover location could be expressed as (a*wa+b*wb+c*wc+d*wd+e*we+f*wf+g*wg+h*wh+i*wi+j*wj+k*wk+l*wl+m*wm+n*wn . . . z*wz)/N, where N represents the total number of input values used.

In the following examples, only a small number of input values are used to determine PQ values for ease of understanding, although significantly more input values may be used as noted above. Referring to the example of FIG. 7, on weekdays between 4 and 6 pm, pullover location 280 may be associated with input values for curb occupancy (a=0.3), bicycle traffic (e=0.3), and traffic conditions (f=0.1). For this same bucket or given periods of time, pullover location 283 may be associated with input values for curb occupancy (a=0.3), bicycle traffic (e=0.9), and traffic conditions (f=0.8). And again, for this same given period of time or bucket, pullover location 287 may be associated with input values for curb occupancy (a=0.9), bicycle traffic (e=0.9), and traffic conditions (0.8). The weighing values for each of these input values may set as we=−0.2 for cub occupancy, we=0.5 for bicycle traffic, and wf=0.3 for traffic conditions. In this regard the PQ values for pullover locations 280, 283, 287 may be determined using a weighted sum as follows:

PQ value for pullover location 280=(0.2)*0.3+(0.5)*0.3+(0.3)*0.1=0.24

PQ value for pullover location 283=(0.2)*0.3+(0.5)*0.9+(0.3)*0.8=0.75

PQ value for pullover location 287=(0.2)*0.9+(0.5)*0.9+(0.3)*0.8=0.87

Thus, in this example, on weekdays between 4 and 6 pm, pullover location 287 has a higher PQ value than each of pullover locations 280 and 283.

As noted above, pullover locations may have different input values for different buckets or given periods of time. As an example, on weekdays between 2 and 3 am, pullover location 280 may be associated with input values for curb occupancy (a=0.1), bicycle traffic (e=1.0), and traffic conditions (0.7). For this same bucket or given period of time, pullover location 283 may be associated with input values for curb occupancy (a=0.1), bicycle traffic (e=1.0), and traffic conditions (0.9). And again, for this same given period of time or bucket, pullover location 287 may be associated with input values for curb occupancy (a=0.9), bicycle traffic (e=1.0), and traffic conditions (f=0.9). During this same given period of time or bucket, the predetermined weighing values may set as we=−0.2 for cub occupancy, we=0.5 for bicycle traffic, and wf=0.3 for traffic conditions. In this regard the discrete, overall PQ values for pullover locations 280, 283, 287 may be determined using a weighted sum as follows:

PQ value for pullover location 280=(0.2)*0.1+(0.5)*1.0+(0.3)*0.7=0.73

PQ value for pullover location 283=(0.2)*0.9+(0.5)*1.0+(0.3)*0.9=0.79

PQ value for pullover location 287=(0.2)*0.9+(0.5)*1.0+(0.3)*0.9=0.95

Thus, in this example, on weekdays between 2 and 3 am, pullover location 287 has a higher PQ value than each of pullover locations 280 and 283, and the PQ values for each of these pullover locations on weekdays are greater between 2 and 3 am than the PQ values for between 4 and 6 pm.

In some instances, weighing values for certain inputs may be adjusted based on input values of other inputs. For instance, if the estimated or expected average length of time a pullover at the pullover location generally takes is very low (e.g. quick), this may affect the weighing values for other inputs. In other words, the speed at which a pullover occurs might be considered more important than other inputs such as the inconvenience input value. In that regard, the weighting value for the inconvenience input value may be very low or set to zero (so that the inconvenience input is ignored) if the estimated or expected average length of time a pullover at the pullover location generally takes is very low for a pullover location.

As another instance, weighing values for certain inputs may be adjusted based on certain types of weather conditions. For example, rainy days might induce other vehicles or drivers to park in certain areas (such as closer to building entrances), which may affect the traffic condition input values (e.g., the areas around building entrances would have a higher traffic condition score on rainy days). In this regard, in rainy conditions, the weighing value for traffic conditions may be increased in rainy weather. As another example, a sunny day might result in higher bicycle traffic, and as such, the weighing value for bicycle traffic or the presence of bike lanes or bicyclists may be increased for such weather conditions.

In some instances, the weighing values used for a weighted sum or a weighted average may be adjusted based on the circumstances for finding a pullover location. For example, if the passenger has a particular disability, the weights might be adjusted in order to increase the weighing value for the accessibility input value and/or the inconvenience value. Increasing the weighing value of both of these inputs may result in the PQ values for pullover locations with greater accessibility and which may also allow a passenger more time to enter or exit a vehicle without inconveniencing other vehicles or traffic. As an example, a particular disability may be identified by a passenger via the application by selecting or adjusting a particular setting (e.g., "minimize walking", "wheelchair", etc. in the application or when requesting a trip. As another example, if a passenger may need more time entering or exiting a vehicle such as if the passenger has indicated they have some cargo to load or if there are multiple passengers entering or exiting the same vehicle, the weights might be adjusted in order to increase the weight of the inconvenience input value in order to favor pullover locations that are less likely to lead to inconvenience to others if the vehicle must remain in the pullover location for a considerable amount of time.

In some instances, some of the inputs may have very few observations or other data points. In such cases, this may be made apparent for a particular input value via a confidence score or implicitly by convergence to a "default" value, such that a value of 0.5 on a scale of 0 to 1 might mean effectively "no information" such that the pullover location is neither more or less desirable for any particular reason. This may provide more clarity as to how to trade off a PQ value against other considerations such as walking time or ease, vehicle travel time, etc.

Figure 8:
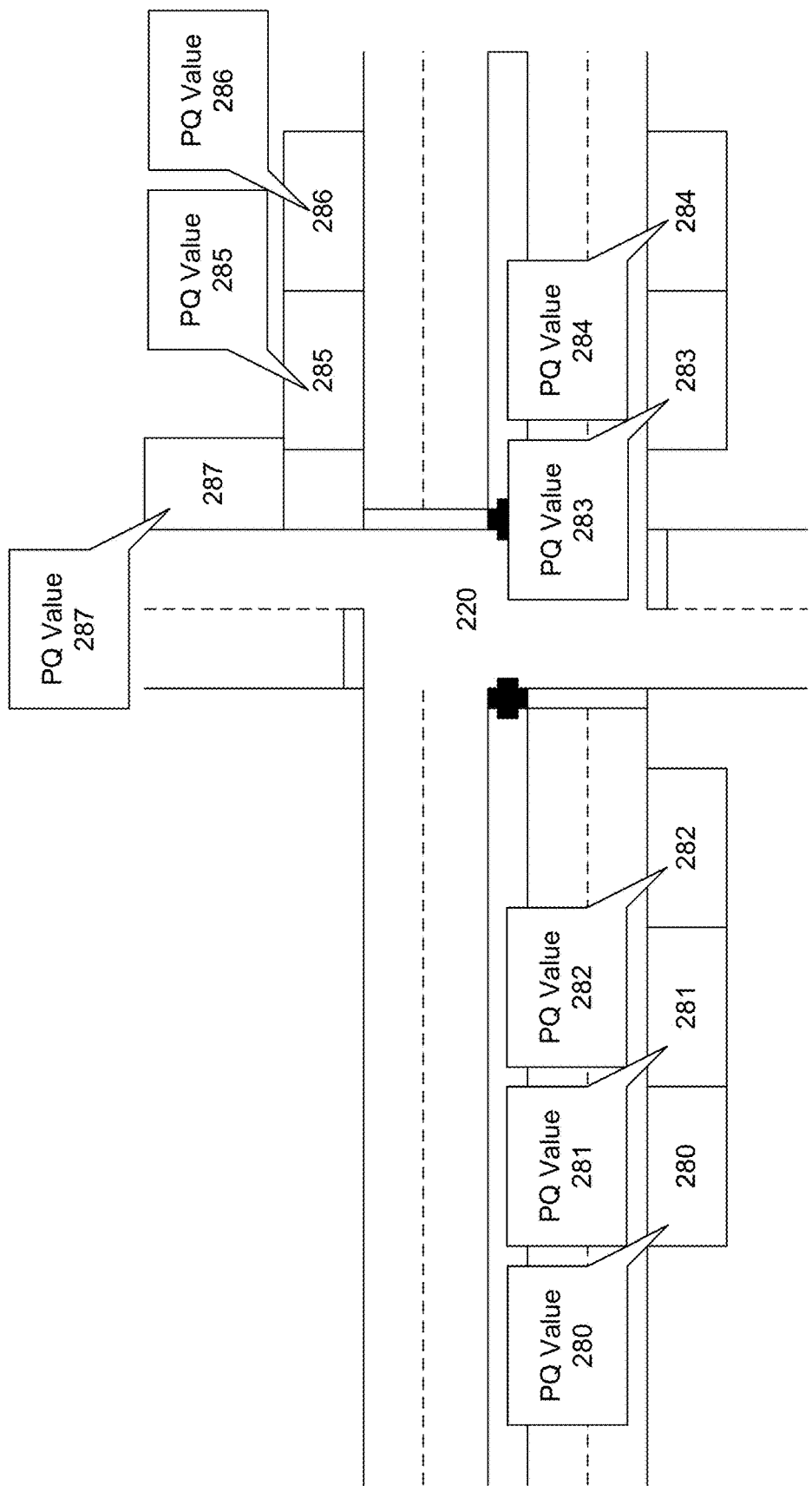
FIG. 8 is an example representation of pullover quality values for a plurality of pullover locations in accordance with aspects of the disclosure.

The PQ values may then be associated with the corresponding pullover locations in the map information of the storage system 450 as well as in the map information of each vehicle. FIG. 8 provides an example representation of the map information 200 annotated with the PQ values. Again, each PQ value may be a discrete overall value which may be associated with additional information such as additional annotations or flags, the input value vector, a vector of specific input values, or a combination of these. Examples of specific input values may include curb occupancy (a), likelihood of unparking vehicles and/or the duration of vehicles (b), inconvenience (d), history of pullovers (h), and accessibility (n) (e.g. a vector <a, b, d, h, n>). These specific input values may better enable the vehicle to "reason" about occluded areas and whether to move to a different pullover location.

In this regard, as shown in block 1230 of FIG. 12, the pullover quality value is sent to a vehicle in order to enable the vehicle to select a pullover location for the vehicle. For instance, the aforementioned PQ values as well as any associated information (e.g. additional annotations or flags, a vector of all of the input values, a vector of specific input values, or a combination of these) may be sent via a network such as network 460 to the computing devices 110 for storage with the map information 200 or directly loaded into the memory 130 of the computing devices 110. Alternatively the input value vector may be sent or downloaded to the computing devices. In this regard, the vehicle's computing devices 110 or other systems may use the input value vector to determine the PQ values for particular pullover locations locally. This may allow the vehicle's computing devices 110, routing system 166, and planning system 166, and/or other systems of the vehicle to use the PQ values and/or the associated information to select pullover locations. In this way, all of the vehicle 100's systems may have access to and use the same pullover metrics for each pullover location.

The PQ values and the aforementioned inputs can be used in various ways. For example, when selecting a pickup or drop off location at the one or more server computing devices 410 or onboard vehicle 100 at computing devices 110, pulling over where there is likely to be available curb space or in pullover locations with higher PQ value may be prioritized. Of course, in addition to PQ values, pullover locations may be determined based on a combination of additional considerations such as distance to the requested location, walking distance/ease, vehicle travel time, accessibility, etc. In this regard, PQ values may be weighed with such additional considerations, and the weighing values used to combine PQ values with such additional considerations may also be adjusted according to circumstances.

For example, using the example of pullover locations 280, 283, 287 with PQ values of 0.24, 0.75, 0.87, respectively for the bucket or given period of time of weekdays between 4 and 6 pm and PQ values of 0.73, 0.79, 0.95, respectively for the bucket or given period of time of weekdays between 2 and 3 am, these values may be weighed with additional considerations, such as walking distance from a location requested by a user (e.g. a pickup or drop off location specified by a user). As an example, the weighing value for PQ values may be wPQ=0.2, and the weighing value for walking distance may be wwalk_dist=0.8. To limit the walking distance, the value for walking distance walk_dist may be 0 if greater than some predetermined distance, such as 10 meters or more or less, or otherwise one. In this example, a PQ value for a pullover location may be combined with walking distance for the bucket or given period of time of weekdays between 4 and 6 pm may be expressed as:

Comb for pullover location 280=(0.2)*0.24+(0.8)*[If walk_dist>10 m then 0, otherwise 1]

Comb for pullover location 283=(0.2)*0.75+(0.8)*[If walk_dist>10 m then 0, otherwise 1]

Comb for pullover location 287=(0.2)*0.87+(0.8)*[If walk_dist>10 m then 0, otherwise 1]

Similarly, a PQ value for a pullover location may be combined with walking distance (to limit walking distance) for the bucket or given period of time of weekdays between 2 and 3 am may be expressed as:

Comb for pullover location 280=(0.2)*0.73+(0.8)*[If walk_dist>10 m then 0, otherwise 1]

Comb for pullover location 283=(0.2)*0.79+(0.8)*[If walk_dist>10 m then 0, otherwise 1]

Comb for pullover location 287=(0.2)*0.95+(0.8)*[If walk_dist>10 m then 0, otherwise 1]

The weights used for these combinations may also be adjusted based on circumstances. For example, if greater time is needed to wait for a passenger or allow the passenger to enter the vehicle such as if the passenger has indicated a disability as described above, the above weighing value for walking distance may be decreased, for instance to walk_dist=0.1, and the weighing value for PQ value may be increased, for instance to wPQ=0.9 as this may result in combinations that favor PQ values that provide for pullover locations that may allow for longer wait times for a passenger over shorter walking distances. In this example, a PQ value for a pullover location may be combined with walking distance for the bucket or given period of time of weekdays between 4 and 6 pm may be expressed as:

Comb for pullover location 280=(0.9)*0.24+(0.1)*[If walk_dist>10 m then 0, otherwise 1]

Comb for pullover location 283=(0.9)*0.75+(0.1)*[If walk_dist>10 m then 0, otherwise 1]

Comb for pullover location 287=(0.9)*0.87+(0.1)*[If walk_dist>10 m then 0, otherwise 1]

Similarly, a PQ value for a pullover location may be combined with walking distance (to limit walking distance) for the bucket or given period of time of weekdays between 2 and 3 am may be expressed as:

Comb for pullover location 280=(0.9)*0.73+(0.1)*[If walk_dist>10 m then 0, otherwise 1]

Comb for pullover location 283=(0.9)*0.79+(0.1)*[If walk_dist>10 m then 0, otherwise 1]

Comb for pullover location 287=(0.9)*0.95+(0.1)*[If walk_dist>10 m then 0, otherwise 1]

As another example, less time is needed to drop off a passenger, the above weighing value for walking distance may be decreased, for instance to wwalk_dist=0.5, and the weighing value for PQ value may be decreased, for instance to wPQ=0.5 as this may result in combinations that favor neither greater walking distances nor PQ values that provide for pullover locations that may allow for longer wait times for a passenger. In this example, a PQ value may be combined with walking distance for the bucket or given period of time of weekdays between 4 and 6 pm may be expressed as:

Comb for pullover location 280=(0.5)*0.24+(0.5)*[If walk_dist>10 m then 0, otherwise 1]

Comb for pullover location 283=(0.5)*0.75+(0.5)*[If walk_dist>10 m then 0, otherwise 1]

Comb for pullover location 287=(0.5)*0.87+(0.5)*[If walk_dist>10 m then 0, otherwise 1]

Similarly, a PQ value may be combined with walking distance (to limit walking distance) for the bucket or given period of time of weekdays between 2 and 3 am may be expressed as:

Comb for pullover location 280=(0.5)*0.73+(0.5)*[If walk_dist>10 m then 0, otherwise 1]

Comb for pullover location 283=(0.5)*0.79+(0.5)*[If walk_dist>10 m then 0, otherwise 1]

Comb for pullover location 287=(0.5)*0.95+(0.5)*[If walk_dist>10 m then 0, otherwise 1]

As another example, in adverse weather conditions, the distance to a desired pullover location (e.g. a location requested by a passenger) may be weighted more than the PQ value and therefore some of the input values of the PQ value (such as inconvenience to other vehicles).

As another example, whether there is a crosswalk that will allow a passenger to cross a street may be weighed more than the PQ value, thereby increasing the ability of the vehicle's computing devices 110 to select a pullover location that is across the street from a desired pullover location. By incorporating PQ value and/or curb occupancy as a signal into a suggested pickup op or drop off location, this may increase the matching between what the passenger expects and what the vehicle ends up doing. For example, typically, a pick up or drop off location may be selected based on a combination of distance to a desired location (i.e. a passenger's current location or drop off location) and an estimated time of arrival for a vehicle. But in situations in which PQ value or the occupancy of the curb proximate to the drop off location is known, the location can be adjusted and communicated to the passenger accordingly. In this regard, a pullover location may be selected that is likely to result in a feasible/high-quality pullover but also balance that against other considerations such as how quickly an available vehicle can get to that location, how close that location is in terms of walking to the passenger's "true" destination, and so on.

In order to improve a passenger's experience, notifications may be sent to the passenger's client computing devices (if a pickup or drop of location) for display, for example, on displays 424, 434 of the client computing devices 420, 430 to users 422, 432. Such notifications may be generated by the one or more server computing devices 410 and/or the computing devices 110 of the vehicle depending upon which computing devices selected the new pullover locations. The notifications may be sent to the client computing device of the passenger for display to the passenger. These notifications may be displayed for example, when the passenger is selecting a pullover location for a pickup or a drop off (e.g. while setting up a new trip a suggested pickup or drop off location is different from what the passenger initially requested), while the vehicle is on its way to pick up the passenger, or even during a trip while the passenger is in the vehicle on the way to a drop off location. If a drop off location is already in the vehicle 100, the notification may also be displayed in the vehicle such as on a display 152 of the vehicle. The notifications may not only indicate that a selected, preferred or prior pullover location is no longer available or needs to be changed, but also where the new pullover location will be.

In this regard, the notifications may suggest how far a passenger would be expected to walk. Such estimations of walking time may be made, for example, by the one or more server computing devices 410, computing devices 110, or even at the passenger's client computing device using an expected or average walking speed of a person and using a walkable distance between the pullover locations. In some instances, if the estimated walking distance is greater than or equal to a threshold, such as 2 minutes or more or less, the notifications may also identify the estimated walking time in the notification. Alternatively, if the walking distance is less than the threshold, a notification may not need to be provided, for example, because passengers may expect to walk short distances to reach a vehicle (at pickup) or a destination (at drop off) and providing notifications for such small notifications may be more of a distraction than a help to the passenger.

Figure 9B:
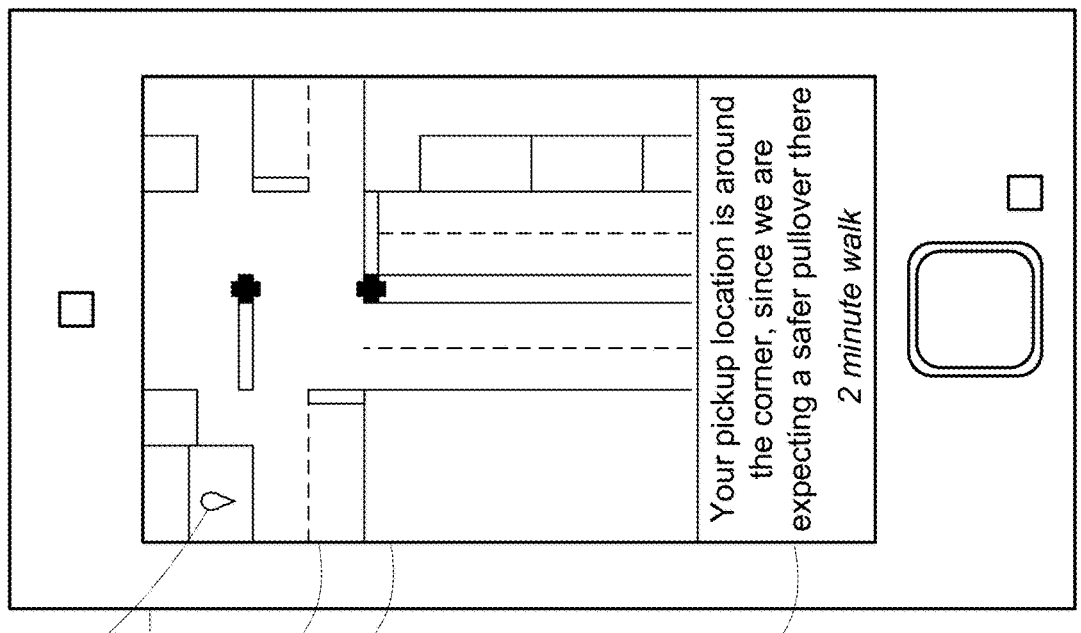
FIGS. 9A and 9B are example visualizations of information and notifications in accordance with aspects of the disclosure.
Figure 9A:
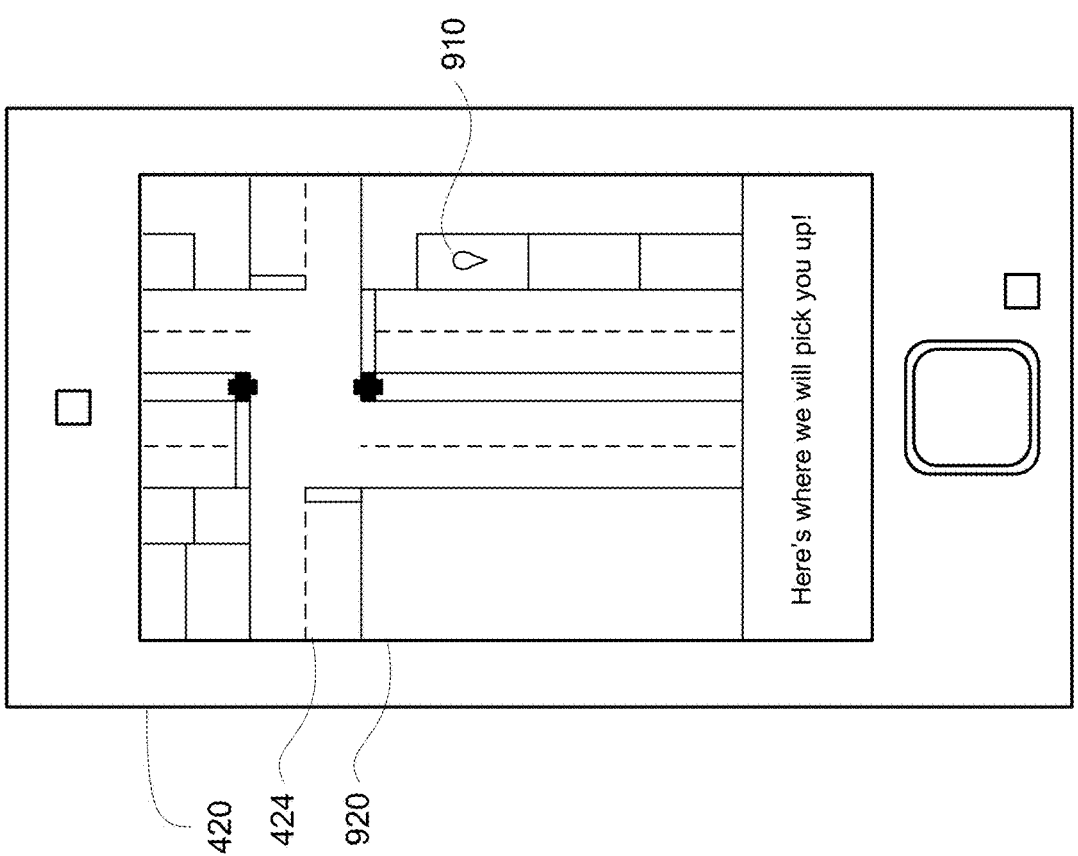

FIGS. 9A and 9B represent example visualizations of information and notifications which may be displayed on display 424 of client computing device 420 to an assigned passenger of the vehicle 100. When the passenger is in a vehicle, similar notifications may also be displayed on display 152 of the vehicle. As shown in FIG. 9A, for small distances for example on the order of less than 50 meters or less than a 2-minute estimated walking time, such as a change from pullover location 280 to pullover location 283, a notification may include a pin location 910 and a map 920 can be displayed to indicate the change in pickup (or drop off location). In this example, the estimated walking time is less than the threshold, so the estimated walking time is not displayed. As shown in FIG. 9B, for larger distances for examples on the order of 50 meters or more or greater than a 2-minute estimated walking time, such as a change from pullover location 280 to pullover location 287, in addition to the pin location 930 and map 940 a more detailed explanation 950 may be provided with the notification. For example, as shown in FIG. 9B, the more detailed explanation 950 also identifies the estimated walking time for the passenger to reach the pullover location 280, here 2 minutes.

In some instances, depending upon how far the passenger will have to walk, the text identifying how far the passenger may have to walk may be displayed in different colors in order to suggest to the passenger how far a walk between pullover locations may be. For example, when the time to walk between pullover locations is 2 minutes or greater, the text "2-minute walk" may be displayed in orange or some other color. If the time to walk between pullover locations is 4 minutes or more, the text for such a notification (e.g. "4-minute walk" may be displayed in red or some other color. If the walk is very short, that is less than 2 minutes, no such text may be displayed and/or no notification may actually be provided. In this regard, the passenger is readily able to identify how long of a walk the passenger will have.

In addition, if a pullover location changes after the passenger has set up a trip (e.g. already provided the pickup and drop off locations or pullover locations), and the passenger is either waiting for the vehicle to pick up the passenger or in the vehicle on the way to a drop off, the computing devices 110 may send the notification directly to the passenger's client computing device and/or via the one or more server computing devices. In this regard, an initial notification including popup or banner notification indicating that a new pickup or drop off location has been selected may be displayed on the passenger's client computing device via the application. Once the passenger selects by tapping or swiping on the display or otherwise accesses this initial notification, the more detailed notifications of FIGS. 9A and/or 9B may be displayed.

Additional context may be provided with the notifications. This additional context may vary depending upon why the new pullover location was selected. For example, this additional context may be regarding safety ("Your pickup location is around the corner, since we are expecting a safer pullover there" as in the example of FIG. 9B), traffic conditions ("We will pick you up at the intersection of Fell and Valencia, since we are expecting less traffic in that area"), etc. To enable this, the input vector values may be analyzed or each PQ value may be provided with additional information such as flags or other types of explanations about which inputs had very large positive or very large negative impacts on the PQ values. This additional information may then be used to provide the context in the notifications to passengers.

In some instances, it may make sense to select a pullover location with a lower PQ value. For example, if a pullover location has a bike lane or a lot of traffic (which may result in a lower PQ value), but a passenger has selected that pullover location (e.g. by requesting initially or by moving a map pin to this location) and other pullover locations nearby do not have larger PQ values than the pullover location it may not be helpful to the passenger or the vehicle to suggest those alternative pullover locations. Similarly, if curb occupancy and/or PQ values suggest that pullover locations on the street are very unlikely to be available, that could cause the vehicle to choose the first pullover location available, even if associated with a low PQ value than other pullover locations which are not yet perceptible (e.g. are occluded) to the vehicle's perception system 172. In such cases, the passenger's client computing device may be sent a notification of such.

Figure 10:
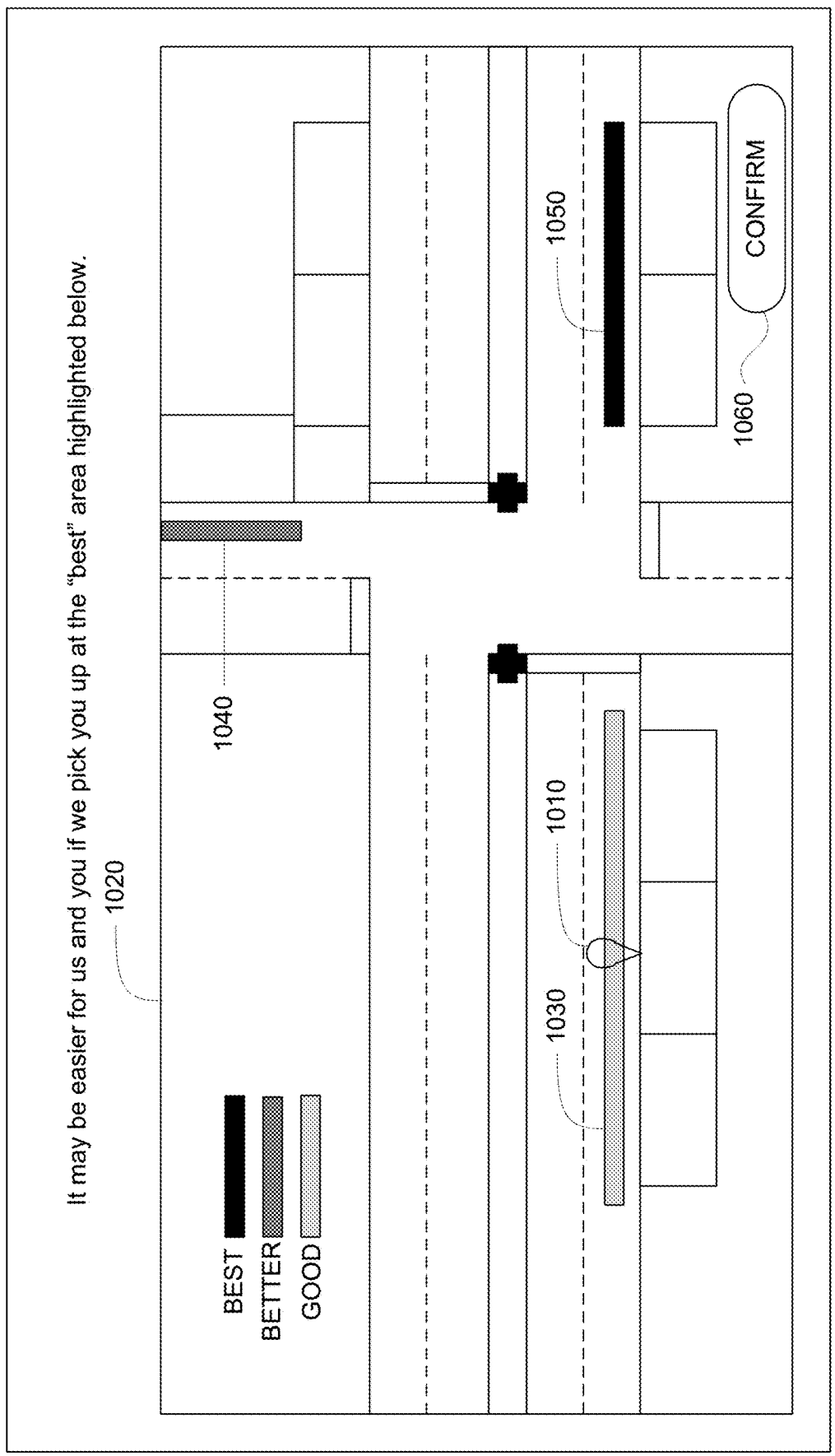
FIG. 10 is an example visualization of information in accordance with aspects of the disclosure.

In addition, PQ value or curb occupancy can be used to encourage passengers to select locations near lower occupancy locations. PQ value could be used to visualize different areas to incentivize better pickup and drop off locations for both the vehicle and the passenger, for instance by highlighting higher PQ value or lower curb occupancy areas on a map. In this regard, a passenger could look farther away from a location by panning or zooming out. In this regard, passengers may be encouraged to select locations where successful pullovers are more likely. For example, FIG. 10 represents an example visualization of a notification that could be displayed to a passenger, for example on the passenger's client computing device, when that passenger is requesting a pickup at the location of the map pin 1010 on a map 1020. As can be seen, the visualization indicates areas 1030, 1040, 1050 each having different shading (or colors) to indicate which areas of the map 1020 may be "good" (light gray), "better" (dark gray), or "best" (black) for the pickup. This may encourage the passenger to pick areas 1040 or area 1050 over area 1030. In response, the passenger may simply leave or reposition the map pin (e.g. by dragging and dropping, using a mouse pointer, etc.), and accept the current or repositioned location of the map pin by choosing the "confirm" option 1060. A similar visualization may be displayed for to indicate which areas of the map may be "good", "better", or "best" for drop off locations as well.

PQ value and curb occupancy can be used for routing and planning (trajectories) purposes. For example, PQ value and curb occupancy can be used when calculating immediate pullover destinations. In other words, the routing system may determine where a vehicle will stop. For instance, a routing system may look for the nearest pullover location using a cost function that accounts for traversal time, maneuver difficulty, and close to the desired pickup or drop off location which also prioritizes other types of constraints such as a low-speed road and other characteristics which make a location suitable for pulling over to pick up or drop off passengers. By using PQ value and curb occupancy in the routing determinations, the vehicle may actually be able to route to a farther location or one that required more difficult maneuvers (e.g. more lane changes or more left turns), if that farther location was deemed to have a higher PQ value or lower curb occupancy. In this way, PQ value and/or curb occupancy can be used as a tie-breaker between two potential pullover locations.

As noted above, PQ value and curb occupancy can also be used by the vehicle's planning system 166, for instance, to determine whether and how to move around objects. For instance, when the vehicle 100 arrives at a location, the vehicle may need to handle uncertainty in its field of view. If there is a larger object blocking the field of view of pullover locations, PQ value and/or the curb occupancy can be used to assist the vehicle to determine whether to pull around the object or to stop behind it. In this way, the vehicle is better able to guess at circumstances which it is not able to perceive. The vehicle's routing system 170 or planning systems 168 may also use PQ value and curb occupancy in a similar way to help with routing when there are occlusions in order to select an optimal pick up or drop off location. For example, the routing system 170 may choose a destination, but the planning system 166 may have quite a bit of discretion in choosing exactly where to pull over. The final pullover location selected by the planning system 166 could be on the order of 50 meters away from where the router suggested, or more or less. As the planning system is maneuvering its way to find an optimal location to pull over, it can use the occlusion data to fill in gaps in sensor information.

Figure 11:
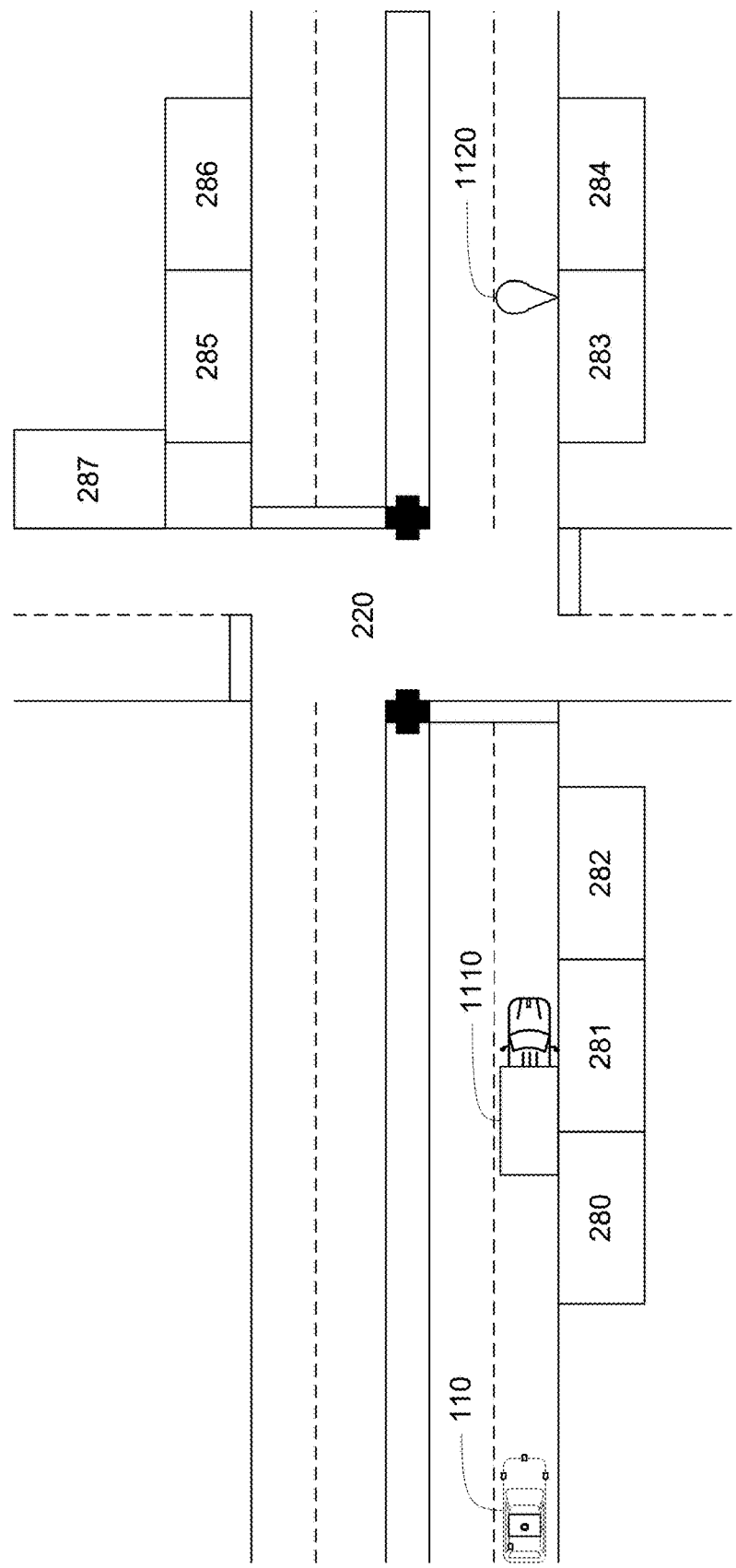
FIG. 11 is an example representation of an example driving scenario in accordance with aspects of the disclosure.

For example, as depicted in the example of FIG. 11, as the vehicle 100 approaches intersection 220, a stopped truck 1110 may prevent the perception system 172 from determining whether pullover location 283, which is closest to a pickup or drop off location 1120 for the vehicle, is available. However, if the PQ values for pullover location 283 or curb occupancy is relatively high (a very good PQ value or a low likelihood of occupancy of the curb), this may be used by the planning system 166 to generate a trajectory that will allow the vehicle 100 to drive around the stopped truck 1110. Thus, once this trajectory is published to the other systems of the vehicle, the computing devices 110 may control the vehicle autonomously to drive around the stopped truck 1110. Without such information, the vehicle 100 may be unable to make such a decision.

A PQ value can be adjusted based on various additional metrics. For example, a passenger sentiment metric, which can be generated by surveys about passenger experience during trips, can be used to measure feedback on pullover predictability. In other words, passengers may provide information about whether or not they felt a particular pullover was "good", "predictable", "inconvenient", etc. In addition, today, there is a deviation between offboard selection (where offboard simulates the vehicle's pullover selection) and what the vehicle actually does (pullover selection) when the same selection function runs in the real world. Generally, this may be due to field of view occlusions and corresponding safety requirements (i.e. avoiding risky behaviors for pulling around objects). If the PQ value values are "good" or determined based on good inputs (i.e. a large volume of collected data for each input), this deviation should decrease. Similarly, the walking inconvenience to a passenger may be a distance that a passenger had to walk to get to the vehicle and can be measured by tracking the distance traveled by the passenger using the vehicle's perception system 172. If the PQ value values are "good", this distance should also decrease and passengers should become more satisfied (which can be measured through human inputs as noted above).

The features described herein may allow for better selection of pullover locations, for instance for temporary parking as well as pick up and drop off locations for passengers as well as goods. As noted above, PQ value and/or curb occupancy can be used in initial pickup and drop off location selection as well as for planning and routing purposes. Thereby improving the overall functionality of the transportation services as well as passenger experience.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
    receiving, by one or more processors, previous observations, by one or more autonomous vehicles of a fleet of autonomous vehicles, of how often and how long one or more first vehicles have previously parked at a predetermined pullover location for an autonomous vehicle of the fleet of autonomous vehicles;
    determining, by the one or more processors based on the previous observations, a likelihood that one or more second vehicles parked at the predetermined pullover location will begin to unpark from the predetermined pullover location;
    determining, by the one or more processors based on the likelihood, a pullover quality value for the predetermined pullover location; and
    enabling the autonomous vehicle to select a pullover location for the autonomous vehicle by providing, by the one or more processors, the pullover quality value to the autonomous vehicle.

2. The method of claim 1, further comprising determining, by the one or more processors based on the previous observations, an expected curb occupancy for the predetermined pullover location for a given period of time, wherein determining the likelihood is further based on the expected curb occupancy.

3. The method of claim 1, further comprising receiving, by the one or more processors, road geometry for the predetermined pullover location, wherein determining the pullover quality value is further based on the road geometry.

4. The method of claim 3, wherein the road geometry relates to whether vehicles park on one or both sides of a road at the predetermined pullover location.

5. The method of claim 1, further comprising receiving, by the one or more processors, an indication of whether the predetermined pullover location is adjacent to a bicycle lane, wherein determining the pullover quality value is further based on the indication.

6. The method of claim 1, further comprising receiving, by the one or more processors, an indication of historical traffic conditions at the predetermined pullover location for a given period of time, wherein determining the pullover quality value is further based on the indication.

7. The method of claim 1, further comprising receiving, by the one or more processors, an indication of legal restrictions at the predetermined pullover location, wherein determining the pullover quality value is further based on the indication.

8. The method of claim 1, further comprising receiving, by the one or more processors, an indication of whether attempted pullovers at the predetermined pullover location by the one or more autonomous vehicles of the fleet of autonomous vehicles included double-parking, blocking a driveway, parking close to an object, or parallel parking, wherein determining the pullover quality value is further based on the indication.

9. The method of claim 1, further comprising:
    receiving, by the one or more processors, different previous observations, by the one or more autonomous vehicles, of one or more first emergency vehicles at the predetermined pullover location; and
    determining, by the one or more processors based on the different previous observations, a different likelihood of one or more second emergency vehicles on a road at the predetermined pullover location, wherein determining the pullover quality value is further based on the different likelihood.

10. The method of claim 1, further comprising:
    receiving, by the one or more processors, different previous observations, by the one or more autonomous vehicles, of one or more vehicles of a particular size or shape parking at the predetermined pullover location; and
    determining, by the one or more processors based on the different previous observations, a feasibility of a vehicle of the particular size or shape to park at the predetermined pullover location, wherein determining the pullover quality value is further based on the feasibility.

11. The method of claim 1, further comprising running, by the one or more processors, simulations of one or more autonomous vehicles attempting to park at the predetermined pullover location, wherein determining the pullover quality value is further based on one or more results of the simulations.

12. The method of claim 1, further comprising receiving, by the one or processors, input from passengers of the fleet of autonomous vehicles providing feedback about attempted pullovers at the predetermined pullover location, wherein determining the pullover quality value is further based on the input.

13. The method of claim 1, further comprising:
    receiving, from a client computing device, a request for a trip identifying a first location;
    using the pullover quality value and the first location to identify a suggested location for the trip; and
    providing the suggested location to the client computing device for display to a user.

14. The method of claim 1, further comprising:
    receiving, from a client computing device, a request for a trip identifying a first location;
    using the pullover quality value and the first location to identify a suggested location for the trip; and
    providing a notification to the client computing device indicating that the autonomous vehicle will pick up or drop off a passenger at the suggested location.

15. The method of claim 14, wherein the notification includes context indicating why the autonomous vehicle will pick up or drop off a passenger at the suggested location, and the method further includes determining the context based on the pullover quality value.

16. The method of claim 15, further comprising:
    determining an estimated walking time to the suggested location; and
    comparing the estimated walking time to a threshold, and wherein providing the notification is further based on the comparison.

17. The method of claim 16, wherein when the comparison indicates that the estimated walking time is greater than the threshold, providing the notification further includes providing the estimated walking time for display with the notification.

18. The method of claim 1, further comprising enabling the autonomous vehicle to select either the predetermined pullover location or a different predetermined pullover location by providing, by the one or more processors to the autonomous vehicle, the pullover quality value and a different pullover quality value associated with the different predetermined pullover location.

19. The method of claim 18, further comprising:
receiving, by the one or more processors, different previous observations, by the one or more autonomous vehicles, of one or more other vehicles at the different predetermined pullover location; and
determining, by the one or more processors based on the different previous observations, the different pullover quality value for the different predetermined pullover location.

20. A system comprising one or more processors configured to:
receive previous observations, by one or more autonomous vehicles of a fleet of autonomous vehicles, of how often and how long one or more first vehicles have previously parked at a predetermined pullover location for an autonomous vehicle of the fleet of autonomous vehicles;
determine, based on the previous observations, a likelihood that one or more second vehicles parked at the predetermined pullover location will begin to unpark from the predetermined pullover location;
determine, based on the likelihood, a pullover quality value for the predetermined pullover location; and
provide the pullover quality value to the autonomous vehicle to enable the autonomous vehicle to select a pullover location for the autonomous vehicle.

* * * * *